(12) United States Patent
Li et al.

(10) Patent No.: US 12,417,065 B2
(45) Date of Patent: *Sep. 16, 2025

(54) MULTI-SCREEN COLLABORATION METHOD AND SYSTEM, AND ELECTRONIC DEVICE

(71) Applicant: Huawei Technologies Co., Ltd., Shenzhen (CN)

(72) Inventors: Xiaomin Li, Wuhan (CN); Puliang Luo, Wuhan (CN); Liang Lei, Wuhan (CN); Qianqiao Hu, Wuhan (CN); Ruishuai Guo, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,704

(22) Filed: May 17, 2024

(65) Prior Publication Data

US 2024/0394004 A1 Nov. 28, 2024

Related U.S. Application Data

(63) Continuation of application No. 17/757,537, filed as application No. PCT/CN2020/133650 on Dec. 3, 2020, now Pat. No. 12,019,942.

(30) Foreign Application Priority Data

Dec. 17, 2019 (CN) .......................... 201911303934.1

(51) Int. Cl.
*G09G 5/00* (2006.01)
*G06F 3/14* (2006.01)

(52) U.S. Cl.
CPC ................................. *G06F 3/1454* (2013.01)

(58) Field of Classification Search
CPC .. G06F 3/0481; G06F 3/04817; G06F 3/1454; G09G 5/12; G09G 2354/00;
(Continued)

(56) References Cited

U.S. PATENT DOCUMENTS 10,631,039 B2   4/2020   Shin et al.
11,385,857 B2 * 7/2022   Fan ...................... G06F 3/0488
(Continued)

FOREIGN PATENT DOCUMENTS

CN        102790917 A      11/2012
CN        104125331 A      10/2014
(Continued)

OTHER PUBLICATIONS

"Introduction to Android TV", Qiita[online], Publication showing well-known technology; Newly-cited publication Dec. 12, 2014, https://qiita.com/hotchemi/items/7e929fb8bbdab64caff7>, total 29 pages with English translation.

*Primary Examiner* — Joe H Cheng
(74) *Attorney, Agent, or Firm* — Slater Matsil, LLP

(57) ABSTRACT

A source device sends, to a destination device, application information of at least one source device application installed on the source device. The destination device displays an icon of the at least one source device application in a first interface, and displays, in the first interface, an icon of at least one destination device application installed on the destination device. In response to an operation performed on an icon of a first application, the destination device obtains first display data generated during running of the first application on the source device. The destination device displays an application window of the first application based on the first display data. In response to an operation performed by the user on an icon of a second application in the destination device application, the destination device starts (Continued)

the second application, and displays an application window
of the second application.

20 Claims, 30 Drawing Sheets

(58) Field of Classification Search
CPC .......... G09G 2360/18; G09G 2370/16; H04M
2250/16; H04N 21/42204
See application file for complete search history.

(56) References Cited

U.S. PATENT DOCUMENTS

| | | |
|---|---|---|
| 2009/0251409 A1 | 10/2009 | Parkinson |
| 2012/0226742 A1 | 9/2012 | Momchilov |
| 2013/0040623 A1 | 2/2013 | Chun et al. |
| 2013/0076594 A1 | 3/2013 | Sirpal |
| 2013/0242192 A1 | 9/2013 | Chen et al. |
| 2013/0290856 A1 | 10/2013 | Beveridge |
| 2014/0181683 A1* | 6/2014 | Lim ................. H04L 63/108 715/740 |
| 2015/0046846 A1 | 2/2015 | Choi et al. |
| 2015/0373389 A1 | 12/2015 | Liao et al. |
| 2016/0182603 A1* | 6/2016 | Chung ................ H04L 67/025 715/740 |
| 2016/0216852 A1 | 7/2016 | Lee et al. |
| 2016/0381108 A1 | 12/2016 | Coppenolle et al. |
| 2017/0192736 A1 | 7/2017 | Kim et al. |
| 2017/0332149 A1* | 11/2017 | Veeramani ............. G09G 5/005 |
| 2018/0067713 A1 | 3/2018 | Morgan |
| 2018/0203662 A1 | 7/2018 | Liu |
| 2018/0205983 A1 | 7/2018 | Lee et al. |
| 2018/0302938 A1 | 10/2018 | Morgan |
| 2020/0007810 A1* | 1/2020 | Hoevenaar ......... H04N 21/4316 |
| 2022/0004306 A1 | 1/2022 | Reeves |

FOREIGN PATENT DOCUMENTS

| | | |
|---|---|---|
| CN | 105740082 A | 7/2016 |
| CN | 106095237 A | 11/2016 |
| CN | 106415431 A | 2/2017 |
| CN | 106507007 A | 3/2017 |
| CN | 108551589 A | 9/2018 |
| CN | 109076125 A | 12/2018 |
| CN | 109254706 A | 1/2019 |
| CN | 109508162 A | 3/2019 |
| CN | 110221798 A | 9/2019 |
| CN | 110312160 A | 10/2019 |
| CN | 110377250 A | 10/2019 |
| CN | 110381195 A | 10/2019 |
| CN | 110381345 A | 10/2019 |
| CN | 110389736 A | 10/2019 |
| CN | 110430463 A | 11/2019 |
| CN | 110471639 A | 11/2019 |
| CN | 110515576 A | 11/2019 |
| CN | 110515579 A | 11/2019 |
| EP | 3304942 A1 | 4/2018 |
| EP | 3982246 A1 | 4/2022 |
| JP | H10105360 A | 4/1998 |
| JP | 2006190255 A | 7/2006 |
| JP | 2013186892 A | 9/2013 |
| JP | 2014053014 A | 3/2014 |
| KR | 20170004481 A | 1/2017 |
| WO | 2018120533 A1 | 7/2018 |
| WO | 2019233241 A1 | 12/2019 |

* cited by examiner

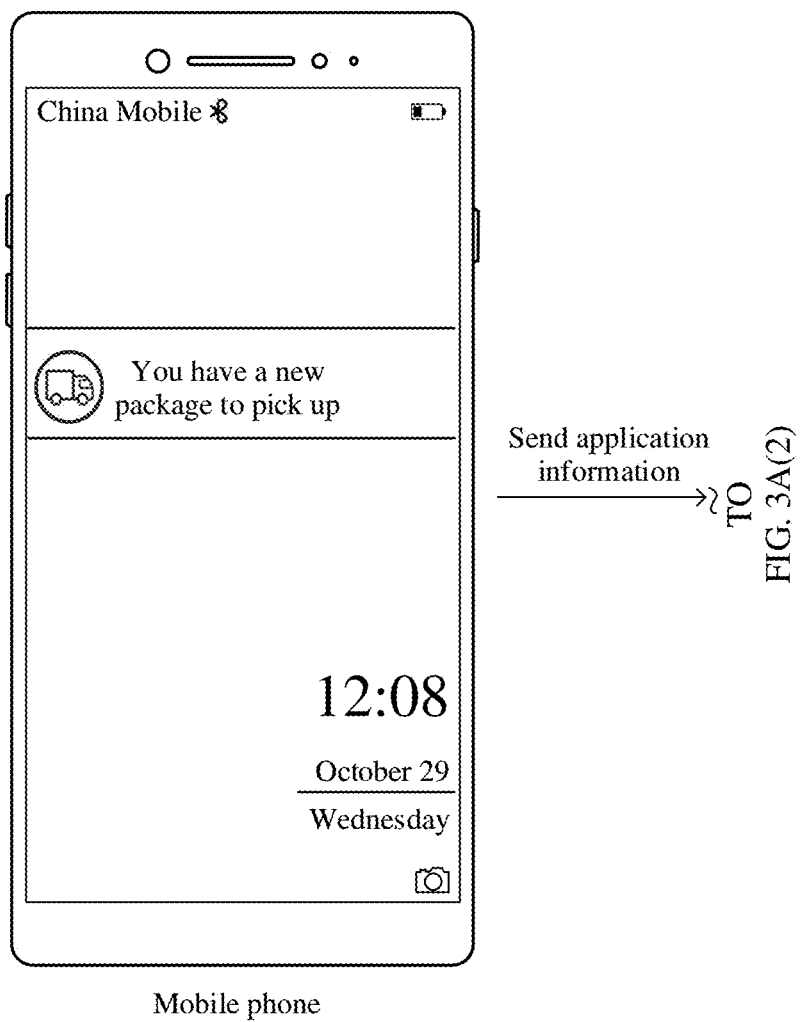
FIG. 3A(1)

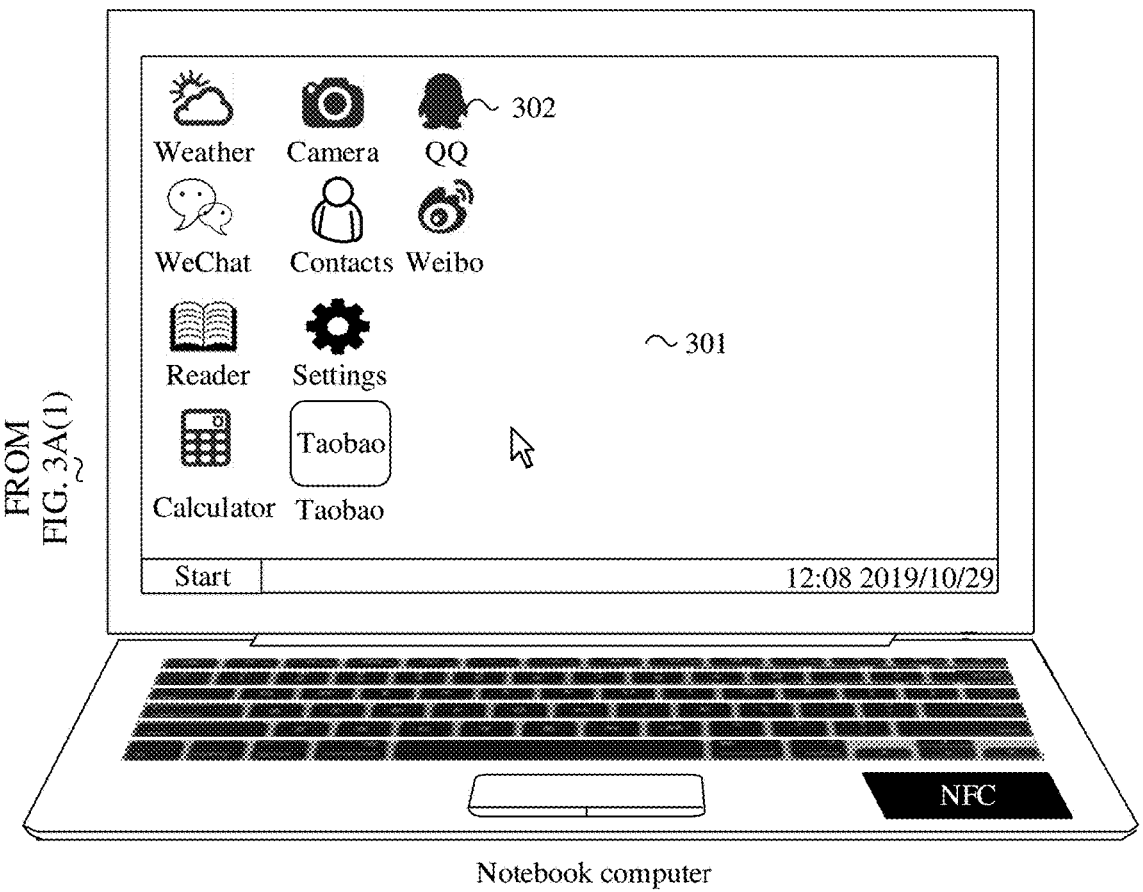
FIG. 3A(2)

CONT. FROM FIG. 12A

CONT. FROM FIG. 12A

CONT. FROM FIG. 12A

CONT. FROM FIG. 12A

Notebook computer

MULTI-SCREEN COLLABORATION METHOD AND SYSTEM, AND ELECTRONIC DEVICE

CROSS-REFERENCE TO RELATED APPLICATIONS

This application is a continuation application of U.S. patent application Ser. No. 17/757,537, filed on Jun. 16, 2022, now U.S. Pat. No. 12,019,942, which is a National Stage of International Application No. PCT/CN2020/133650 filed on Dec. 3, 2020, which claims priority to Chinese Patent Application No. 201911303934.1, filed on Dec. 17, 2019, all of which are hereby incorporated by reference in their entireties.

TECHNICAL FIELD

This application relates to the terminal field, and in particular, to a multi-screen collaboration method and system, and an electronic device.

BACKGROUND

With development of intelligent terminal technologies, a user or a family usually has a plurality of electronic devices that can communicate with each other. Various electronic devices generally have respective device characteristics. For example, a mobile phone is more portable, a television screen has a better display effect, and sound quality of a sound box is better. To give full play to device characteristics of different electronic devices, an electronic device can switch display of display data between a plurality of devices through screen projection or the like.

For example, a mobile phone is used as a source device. The mobile phone may project an application interface or a task (for example, a video playback task) that is being run onto a destination device (for example, a television or a PC) for display. For example, when the mobile phone runs a video app, if a user enables a screen projection function of the mobile phone and selects a PC as the destination device, the mobile phone may be used as a source device to project an application interface of the video app onto the PC for display.

In other words, when the mobile phone performs screen projection onto the PC, the PC may be used as another display of the mobile phone to display content in the mobile phone. In this case, although the user can operate the PC to control a related application in the mobile phone, the user cannot operate the PC to implement a related function originally provided by the PC. In a word, after the source device performs screen projection onto the destination device, capabilities provided by the source device and the destination device cannot be effectively integrated on the destination device to implement a multi-screen collaboration function. Consequently, the user cannot simultaneously use, on the destination device, functions provided by the source device through screen projection and functions provided by the destination device.

SUMMARY

This application provides a multi-screen collaboration method and system, and an electronic device, so that application functions of various applications provided by a source device can be integrated with those on a destination device, to facilitate a user in operating, on the destination device, different applications installed on the source device and the destination device, and implement a multi-screen collaboration function.

To achieve the foregoing objective, the following technical solutions are used in this application.

According to a first aspect, this application provides a multi-screen collaboration method, including: A source device sends, to a destination device, application information of at least one application (which may be referred to as a source device application) installed on the source device; the destination device displays an icon of the at least one source device application in a first interface based on the application information, and the destination device displays, in the first interface, an icon of at least one application (which may be referred to as a destination device application) installed on the destination device; when detecting an operation performed by a user on an icon of a first application (where the first application is an application in the source device application) on the destination device, the destination device may obtain first display data generated during running of the first application on the source device; the destination device may display an application window of the first application in the first interface based on the first display data; and when detecting an operation performed by the user on an icon of a second application (where, the second application is an application in the destination device application) on the destination device, the destination device may start the second application, and display an application window of the second application in the first interface.

In a word, all device capabilities of the source device may be presented on the destination device in a form of application icons of the source device, and all device capabilities of the destination device may also be presented on the destination device in a form of application icons of the destination device. In this way, the user can conveniently use, on the destination device, an application provided by the destination device and an application provided by the source device, and application functions provided by the source device can be effectively integrated with those on the destination device without affecting normal running of the destination device. This improves user experience in multi-screen interaction and collaboration.

For example, the source device may run a first operating system, and the destination device may run a second operating system. The first operating system may be the same as or different from the second operating system. For example, the first operating system may be an Android operating system, and the second operating system may be a Windows operating system.

In a possible implementation, the application information may include an identifier of the at least one source device application. In this case, that the destination device obtains, in response to an operation performed by a user on an icon of a first application on the destination device, first display data generated during running of the first application on the source device specifically includes: The destination device sends a first startup message to the source device in response to the operation performed by the user on the icon of the first application on the destination device, where the first startup message includes an identifier of the first application; and in response to the first startup message, the source device may start the first application based on the identifier of the first application, and send the first display data generated during running of the first application to the destination device.

In addition to the identifier of the application, the application information may further include the icon of the at least one source device application. In this way, after receiving the application information, the destination device can display the icon in the application information in the first interface, and present the device capability of the source device to the user.

In a possible implementation, the first display data may be a drawing instruction that is generated for a first application interface in a corresponding buffer queue during running of the first application; the first display data may be frame data (which may also be referred to as graphics data) that is generated by SurfaceFlinger of the source device for the first application interface based on the drawing instruction during running of the first application; or the first display data may be pixel data (for example, RGB data) that is generated by HWcomposer of the source device for the first application interface based on the frame data during running of the first application.

For example, before sending the first display data to the destination device, the source device may first encode the first display data by using a video encoder, to reduce a data amount by compressing the display data to be sent to the destination device.

In a possible implementation, the application window of the first application may include the first application interface of the first application and a title bar, and the title bar includes a minimize button, a maximize button, and a close button of the first application, or the title bar may further include information such as an application name. Certainly, the application window of the first application may alternatively not include the foregoing title bar.

Similarly, the application window of the second application may include a second application interface of the second application and a title bar. In this way, the user can conveniently open an application of the source device or an application of the destination device on the destination device.

In a possible implementation, when the destination device displays the application window of the first application, the method further includes: The source device displays the first application interface of the first application; or the source device displays an application interface of a third application, where the third application is an application of the source device different from the first application. In a word, the source device may start the first application in the foreground or background, and display the first application on the destination device in cross-screen mode, without affecting an application that is being run on the source device.

In a possible implementation, the source device includes a first display module (for example, a display module 1) and a second display module (for example, a display module 2). In other words, the source device supports a multi-display-module mode. The first display module is configured to provide display data for the source device, the second display module is configured to provide display data for the destination device, and the first display data displayed by the destination device may be stored in the second display module. In this case, that the destination device obtains first display data generated during running of the first application on the source device includes: The destination device obtains, from the second display module of the source device, the first display data generated during running of the first application.

In a possible implementation, similar to the application window of the first application that is displayed in cross-screen mode, after the destination device displays the application window of the first application in the first interface based on the first display data, the method further includes:

The source device receives a second startup message sent by the destination device, where the second startup message includes an identifier of a fourth application, and the fourth application is an application of the source device different from the first application; the source device starts the fourth application in response to the second startup message, and further stores second display data generated during running of the fourth application in the second display module; and the destination device obtains the second display data from the second display module, and displays an application window of the fourth application in the first interface based on the second display data. This implements display of a plurality of applications of the source device in cross-screen mode.

For example, each display module of the source device corresponds to a physical screen with a particular size. After the source device receives the second startup message sent by the destination device, the method further includes: The source device sends location information of the second display data to the destination device, where the location information is used to indicate a specific location of the application window of the fourth application on a screen corresponding to the second display module. In this case, that the destination device obtains the second display data from the second display module includes: The destination device obtains the second display data from the second display module based on the location information. In this way, when the second display module stores display data of a plurality of applications, the destination device can obtain, based on corresponding location information, display data of an application currently operated by the user. This implements display of a plurality of application windows in cross-screen mode at an application granularity.

Alternatively, the second display module includes first display space and second display space. In other words, the second display module is divided into a plurality of pieces of real space in advance during running of a plurality of applications. For example, the first display space is used to store the first display data, and the second display space is used to store the second display data. In this case, that the destination device obtains the second display data from the second display module includes: The destination device obtains the second display data from the second display space. In this case, the destination device does not need to obtain the location information of the second display data relative to the second display module.

In a possible implementation, the source device may further include a third display module, and the third display module may also be configured to provide display data for the destination device. After the destination device displays the application window of the first application in the first interface based on the first display data, the method further includes: The source device receives a second startup message sent by the destination device, where the second startup message includes an identifier of a fourth application, and the fourth application is an application of the source device different from the first application; the source device starts the fourth application in response to the second startup message, and stores second display data generated during running of the fourth application in the third display module; and the destination device obtains the second display data from the third display module, and displays an application window of the fourth application in the first interface based on the third display data. In a word, each application that is on the source device and that needs to be run on the destination device may correspond to one display module. In this way, display modules corresponding to applications do not overlap, and the destination device can obtain display data of a related application from a corresponding display module for display.

In a possible implementation, after the destination device displays the application window of the first application in the first interface based on the first display data, the method further includes: In response to an operation of opening the first application by the user on the source device, the source device stores the first display data generated during running of the first application in the first display module, and continues to provide display data for the source device by using the first display module; or in response to an operation of opening the first application by the user on the source device, the source device reads and displays the first display data stored in the second display module. To be specific, after the first application of the source device is displayed on the destination device in cross-screen mode, the user may further open and display the first application on the source device. For example, the user may open the first application that is being run by using a multitask window on the source device. In this case, the source device may store the display data of the first application in the corresponding first display module, and provide the display data for a display of the source device by using the first display module, or the source device may provide the display data for the display of the source device by using the second display module.

In a possible implementation, after the destination device displays the application window of the first application in the first interface based on the first display data, the method further includes: In response to a first operation input by the user in the application window of the first application, the destination device sends a first control message corresponding to the first operation to the source device, where the first control message includes the identifier of the first application; and in response to the first control message, the source device executes an operation instruction corresponding to the first control message for the first application. In this way, the user can operate content that is projected onto the destination device for display. This implements various functions of a related application of the source device on the destination device.

In a possible implementation, after the source device sends, to the destination device, the application information of the at least one source device application installed on the source device, the method further includes: The destination device displays a first button in the first interface. In this case, that the destination device displays an icon of the at least one source device application in a first interface based on the application information includes: When detecting that the user selects the first button, the destination device displays the icon of the at least one source device application in the first interface based on the application information.

For example, the first button is located in a preset presentation bar, the application information may further include a frequency of use or a running status of the application, and the method further includes: The destination device displays, on the presentation bar based on the application information, an icon or icons of one or more applications whose frequency of use is greater than a preset value; or the destination device displays, on the presentation bar based on the application information, an icon or icons of one or more applications that are being run on the source device.

The preset presentation bar may be a dock bar, a floating window, or the like, and a position of the preset presentation bar can be set or dragged by the user.

In a possible implementation, the first button is located in a preset presentation bar, and the method further includes: In response to an operation of adding a new application by the user, the destination device adds an icon of the new application to the presentation bar.

In a possible implementation, the destination device may display the icon of the at least one source device application on a desktop, a start menu, a taskbar, or a tile of the destination device. This is not limited in embodiments of this application.

In a possible implementation, the destination device may include an electronic label or an NFC chip, and the source device may also include an electronic label or an NFC chip. Before the source device sends, to the destination device, the application information of the at least one source device application installed on the source device, the method further includes: When the source device approaches or touches the electronic label or the NFC chip on the destination device, the source device establishes a communication connection to the destination device. In this way, the source device may be triggered, in a "touch" manner between the source device and the destination device, to display one or more applications of the source device on the destination device in cross-screen mode.

According to a second aspect, this application provides a multi-screen collaboration method, including: A destination device receives application information of at least one source device application sent by a source device, where the source device runs a first operating system, and the destination device runs a second operating system; the destination device displays an icon of the at least one source device application in a first interface based on the application information, and the destination device displays, in the first interface, an icon of at least one destination device application installed on the destination device; in response to an operation performed by a user on an icon of a first application (where the first application is an application in the source device application) on the destination device, the destination device obtains first display data generated during running of the first application on the source device; the destination device displays an application window of the first application in the first interface based on the first display data; and in response to an operation performed by the user on an icon of a second application (where the second application is an application in the destination device application) on the destination device, the destination device may start the second application, and displays an application window of the second application in the first interface.

In a word, all device capabilities of the source device may be presented on the destination device in a form of application icons of the source device, and all device capabilities of the destination device may also be presented on the destination device in a form of application icons of the destination device. In this way, the user can conveniently use, on the destination device, an application provided by the destination device and an application provided by the source device, and application functions provided by the source device can be effectively integrated with those on the destination device without affecting normal running of the destination device. This improves user experience in multi-screen interaction and collaboration.

In a possible implementation, the application information includes an identifier of the at least one source device application; and that the destination device obtains, in response to an operation performed by a user on an icon of a first application on the destination device, first display data generated during running of the first application on the source device includes: In response to the operation performed by the user on the icon of the first application on the destination device, the destination device sends a first startup message to the source device, where the first startup message includes an identifier of the first application; and the destination device obtains, from the source device, the first display data generated during running of the first application.

In a possible implementation, the application window of the first application may include a first application interface of the first application and a title bar, and the title bar includes a minimize button, a maximize button, and a close button of the first application.

Similarly, the application window of the second application includes a second application interface and a title bar of the second application. Certainly, the title bar may further include information such as an application name.

In a possible implementation, the source device includes a first display module and a second display module, the first display module is configured to provide display data for the source device, the second display module is configured to provide display data for the destination device, and the first display data is stored in the second display module. That the destination device obtains first display data generated during running of the first application on the source device includes: The destination device obtains, from the second display module, the first display data generated during running of the first application.

In a possible implementation, after the destination device displays the application window of the first application in the first interface based on the first display data, the method further includes: In response to an operation performed by the user on an icon of a third application on the destination device, the destination device sends a second startup message to the source device, where the second startup message includes an identifier of the third application, and the third application is an application of the source device different from the first application; and the destination device obtains, from the second display module, second display data generated during running of the third application, and displays an application window of the third application in the first interface based on the second display data.

In a possible implementation, after the destination device sends the second startup message to the source device, the method further includes: The destination device receives location information that is of the second display data and that is sent by the source device. That the destination device obtains, from the second display module, second display data generated during running of the third application includes: The destination device obtains, from the second display module based on the location information, the second display data generated during running of the third application.

In a possible implementation, the second display module includes first display space and second display space, the first display space is used to store the first display data, and the second display space is used to store the second display data. That the destination device obtains, from the second display module, second display data generated during running of the third application includes: The destination device obtains, from the second display space, the second display data generated during running of the third application.

In a possible implementation, the source device further includes a third display module, and the third display module is also configured to provide display data for the destination device. After the destination device displays the application window of the first application in the first interface based on the first display data, the method further includes: In response to an operation performed by the user on an icon of a third application on the destination device, the destination device sends a second startup message to the source device, where the second startup message includes an identifier of the third application, and the third application is an application of the source device different from the first application; and the destination device obtains, from the third display module, second display data generated during running of the third application, and displays an application window of the third application in the first interface based on the second display data.

In a possible implementation, after the destination device displays the application window of the first application in the first interface based on the first display data, the method further includes: In response to a first operation input by the user in the application window of the first application, the destination device sends, to the source device, a first control message corresponding to the first operation, so that the source device executes an operation instruction corresponding to the first control message for the first application, where the first control message includes the identifier of the first application. In this way, the user can operate content that is projected onto the destination device for display. This implements various functions of a related application of the source device on the destination device.

In a possible implementation, the destination device may further display a first button in the first interface. In this case, that the destination device displays an icon of the at least one source device application in a first interface based on the application information includes: When detecting that the user selects the first button, the destination device displays the icon of the at least one source device application in the first interface based on the application information.

For example, the first button is located in a preset presentation bar, the application information may further include a frequency of use or a running status of the application, and the method further includes: The destination device displays, on the presentation bar based on the application information, an icon or icons of one or more applications whose frequency of use is greater than a preset value; or the destination device displays, on the presentation bar based on the application information, an icon or icons of one or more applications that are being run on the source device.

The preset presentation bar may be a dock bar, a floating window, or the like, and a position of the preset presentation bar can be set or dragged by the user.

In a possible implementation, the first button is located in a preset presentation bar, and the method further includes: In response to an operation of adding a new application by the user, the destination device adds an icon of the new application to the presentation bar.

In a possible implementation, an icon of an application of the source device may be displayed on a desktop, a start menu, a taskbar, or a tile of the destination device. In a word, an application list projected by the source device onto the destination device for display does not affect an application list originally displayed by the destination device. Therefore, on the destination device, the user not only can operate an icon provided by the destination device to use a related function, but also can operate an icon of an application provided by the source device to use a related function of the source device. This implements a multi-screen collaboration function.

According to a third aspect, this application provides a multi-screen collaboration method, including: A source device sends, to a destination device, application information of at least one source device application installed on the source device, so that the destination device displays an icon of the at least one source device application based on the application information, where the source device runs a first operating system, and the destination device runs a second operating system; the source device receives a first startup message sent by the destination device, where the first startup message includes an identifier of a first application (where the first application is an application in the source device application); and in response to the first startup message, the source device starts the first application based on the identifier of the first application, and sends first display data generated during running of the first application to the destination device.

It can be learned that the source device may send application information of one or more applications installed on the source device to the destination device, so that the destination device can present an application list of the applications installed on the source device to the user. In this way, all device capabilities of the source device can be presented on the destination device in a form of the application list, and the user can open and display, on the destination device according to a requirement of the user, one or more applications installed on the source device. This implements display of one or more applications on different devices in cross-screen mode, and improves user experience.

In a possible implementation, the first display data may be a drawing instruction that is generated for a first application interface in a corresponding buffer queue during running of the first application; the first display data may be frame data (which may also be referred to as graphics data) that is generated by SurfaceFlinger of the source device for the first application interface based on the drawing instruction during running of the first application; or the first display data may be pixel data (for example, RGB data) that is generated by HWcomposer of the source device for the first application interface based on the frame data during running of the first application.

In a possible implementation, before the source device sends the first display data generated during running of the first application to the destination device, the method further includes: The source device encodes the first display data by using a video encoder, to reduce a data amount by compressing the display data to be sent to the destination device.

In a possible implementation, that the source device starts the first application based on the identifier of the first application includes: The source device starts the first application in the foreground or background based on the identifier of the first application.

In a possible implementation, the source device includes a first display module and a second display module, the first display module is configured to provide display data for the source device, the second display module is configured to provide display data for the destination device, and the first display data is stored in the second display module.

In a possible implementation, after the source device sends the first display data generated during running of the first application to the destination device, the method further includes: The source device receives a second startup message sent by the destination device, where the second startup message includes an identifier of a second application, the second application is one of the at least one source device application, and the second application is different from the first application; and the source device starts the second application in response to the second startup message, and sends second display data generated during running of the second application to the second display module.

In a possible implementation, in response to the second startup message, the method further includes: The source device sends location information of the second display data to the destination device.

In a possible implementation, the second display module includes first display space and second display space, the first display space is used to store the first display data, and the second display space is used to store the second display data. That the source device sends second display data generated during running of the second application to the second display module includes: The source device sends the second display data generated during running of the second application to the second display space.

In a possible implementation, the source device further includes a third display module, and the third display module is also configured to provide display data for the destination device; and after the source device sends the first display data generated during running of the first application to the destination device, the method further includes: The source device receives a second startup message sent by the destination device, where the second startup message includes an identifier of a second application, the second application is one of the at least one source device application, and the second application is different from the first application; and the source device starts the second application in response to the second startup message, and sends second display data generated during running of the second application to the third display module.

In a possible implementation, after the source device sends the first display data generated during running of the first application to the destination device, the method further includes: The source device receives a first control message sent by the destination device, where the first control message includes the identifier of the first application; and in response to the first control message, the source device executes an operation instruction corresponding to the first control message for the first application.

According to a fourth aspect, this application provides a destination device, including a display, a communication module, one or more processors, one or more memories, and one or more computer programs. The processor is coupled to the communication module, the communication module, and the memory. The one or more computer programs are stored in the memory. When the destination device runs, the processor executes the one or more computer programs stored in the memory, to enable the destination device to perform the multi-screen collaboration method according to any one of the second aspect or the possible implementations of the second aspect.

According to a fifth aspect, this application provides a source device, including a display, a communication module, one or more processors, one or more memories, and one or more computer programs. The processor is coupled to the communication module, the communication module, and the memory. The one or more computer programs are stored in the memory. When the source device runs, the processor executes the one or more computer programs stored in the memory, to enable the source device to perform the multi-screen collaboration method according to any one of the third aspect or the possible implementations of the third aspect.

According to a sixth aspect, this application provides a multi-screen collaboration system, including the foregoing destination device and source device, where the destination device and the source device may perform, through interaction, the multi-screen collaboration method according to any one of the first aspect or the possible implementations of the first aspect.

According to a seventh aspect, this application provides a computer-readable storage medium, including computer instructions. When the computer instructions are run on the foregoing destination device or source device, the destination device or the source device is enabled to perform the multi-screen collaboration method according to any one of the foregoing aspects.

According to an eighth aspect, this application provides a computer program product. When the computer program product runs on the foregoing destination device or source device, the destination device or the source device is enabled to perform the multi-screen collaboration method according to any one of the foregoing aspects.

It may be understood that the destination device, the source device, the multi-screen collaboration system, the computer-readable storage medium, and the computer program product that are provided in the foregoing aspects are all applicable to the foregoing corresponding methods. For beneficial effects that can be achieved by the destination device, the source device, the multi-screen collaboration system, the computer-readable storage medium, and the computer program product, refer to the beneficial effects achieved by using the foregoing corresponding system or methods. Details are not described herein again.

BRIEF DESCRIPTION OF THE DRAWINGS

FIG. 3A(1) and FIG. 3A(2) are a schematic diagram 2 of an application scenario of a multi-screen collaboration method according to an embodiment of this application;

DETAILED DESCRIPTION OF ILLUSTRATIVE EMBODIMENTS

The following describes implementations of embodiments in detail with reference to accompanying drawings.

Figure 1:
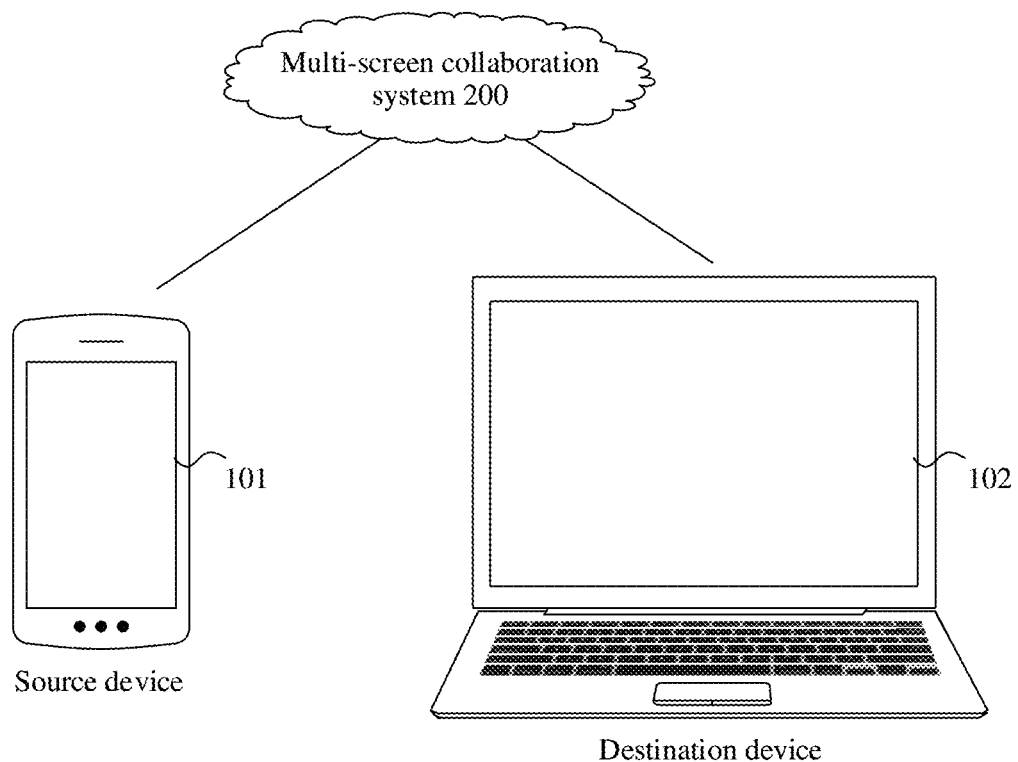
FIG. 1 is a schematic diagram of an architecture of a multi-screen collaboration system according to an embodiment of this application.

A multi-screen collaboration method provided in embodiments of this application may be applied to a multi-screen collaboration system 200 shown in FIG. 1. As shown in FIG. 1, the multi-screen collaboration system 200 may include a first electronic device 101 and a second electronic device 102.

The first electronic device 101 and the second electronic device 102 each may be specifically a device with a display function, such as a mobile phone, a tablet computer, a smart television, a notebook computer, an ultra-mobile personal computer (UMPC), a handheld computer, a netbook, a personal digital assistant (PDA), a wearable electronic device, a vehicle-mounted device, or a virtual reality device. This is not limited in embodiments of this application.

For example, both the first electronic device 101 and the second electronic device 102 may be mobile phones, both the first electronic device 101 and the second electronic device 102 may be notebook computers, or the first electronic device 101 may be a mobile phone or a tablet computer, and the second electronic device 102 may be a notebook computer or a smart television.

In some embodiments, the first electronic device 101 may be used as a source device, and the second electronic device 102 may be used as a destination device of the first electronic device 101. The first electronic device 101 may project content (for example, an application, a picture, a video, audio, or a document) of the first electronic device 101 onto a display of the electronic device 102 for display, to implement a cross-screen display function.

For example, the first electronic device 101 is a mobile phone, and the second electronic device 102 is a notebook computer. In some scenarios, a user may use the mobile phone as the source device, and project one or more applications of the mobile phone onto the notebook computer (that is, the destination device) for display.

Figure 2:
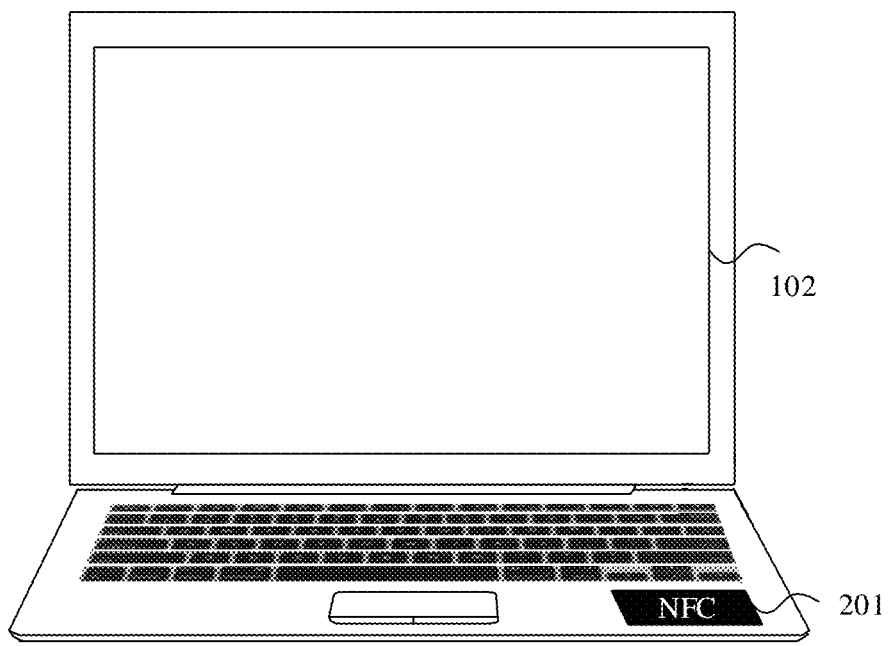
FIG. 2 is a schematic diagram 1 of an application scenario of a multi-screen collaboration method according to an embodiment of this application.

For example, as shown in FIG. 2, an electronic label 201 may be disposed on the notebook computer (namely, the second electronic device 102), and the electronic label may also be referred to as an NFC (near field communication) label. A coil is usually disposed on the electronic label 201, and device information of the notebook computer may be written into the coil of the electronic label 201 in advance before delivery of the notebook computer. For example, the device information may include a name of the notebook computer, a Bluetooth MAC (media access control) address, and the like. Alternatively, an NFC chip may be disposed on the notebook computer, and the NFC chip stores device information of the notebook computer.

In this case, when the user needs to project an application of the mobile phone onto the notebook computer for display, the user may enable an NFC function of the mobile phone, and have the mobile phone approach or touch the electronic label 201 (or the NFC chip) on the notebook computer. In this way, when approaching the electronic label 201 (or the NFC chip), the mobile phone may read the device information of the notebook computer from the electronic label 201 (or the NFC chip) by transmitting a near field communication signal. Then, the mobile phone may establish a wireless communication connection to the notebook computer based on the device information of the notebook computer. For example, the wireless communication connection may be specifically a Bluetooth connection, a Wi-Fi connection, or a Wi-Fi P2P (peer to peer, peer to peer) connection. This is not limited in embodiments of this application.

Certainly, in addition to the manner in which the mobile phone establishes the wireless communication connection to the notebook computer by touching the electronic label 201 on the notebook computer, a person skilled in the art may design another manner to establish a communication connection between the mobile phone and the notebook computer. This is not limited in embodiments of this application. For example, the user may connect the mobile phone to the notebook computer by using a data cable, to establish the communication connection between the mobile phone and the notebook computer. For another example, the mobile phone may obtain the device information of the notebook computer by reading a QR code or a barcode displayed by the notebook computer, and establish the wireless communication connection to the notebook computer.

As shown in FIG. 3A(1) and FIG. 3A(2), after the mobile phone establishes the communication connection to the notebook computer, the mobile phone may send application information of N (where N is an integer greater than 0) applications installed on the mobile phone to the notebook computer. The application information may include icons and identifiers of the applications. The identifier of the application may be an application package name (packgenome), an ID, or the like. The icon of the application may also be referred to as a shortcut for the application. Alternatively, the application information may further include parameters such as running statuses (for example, being run in the foreground or background) and frequencies of use of the applications. Then, still as shown in FIG. 3A(1) and FIG. 3A(2), the notebook computer may display the icons 302 of the N applications on a desktop 301 of the notebook computer based on the received application information. In this way, an application list of the mobile phone is displayed on the notebook computer.

Figure 3B:
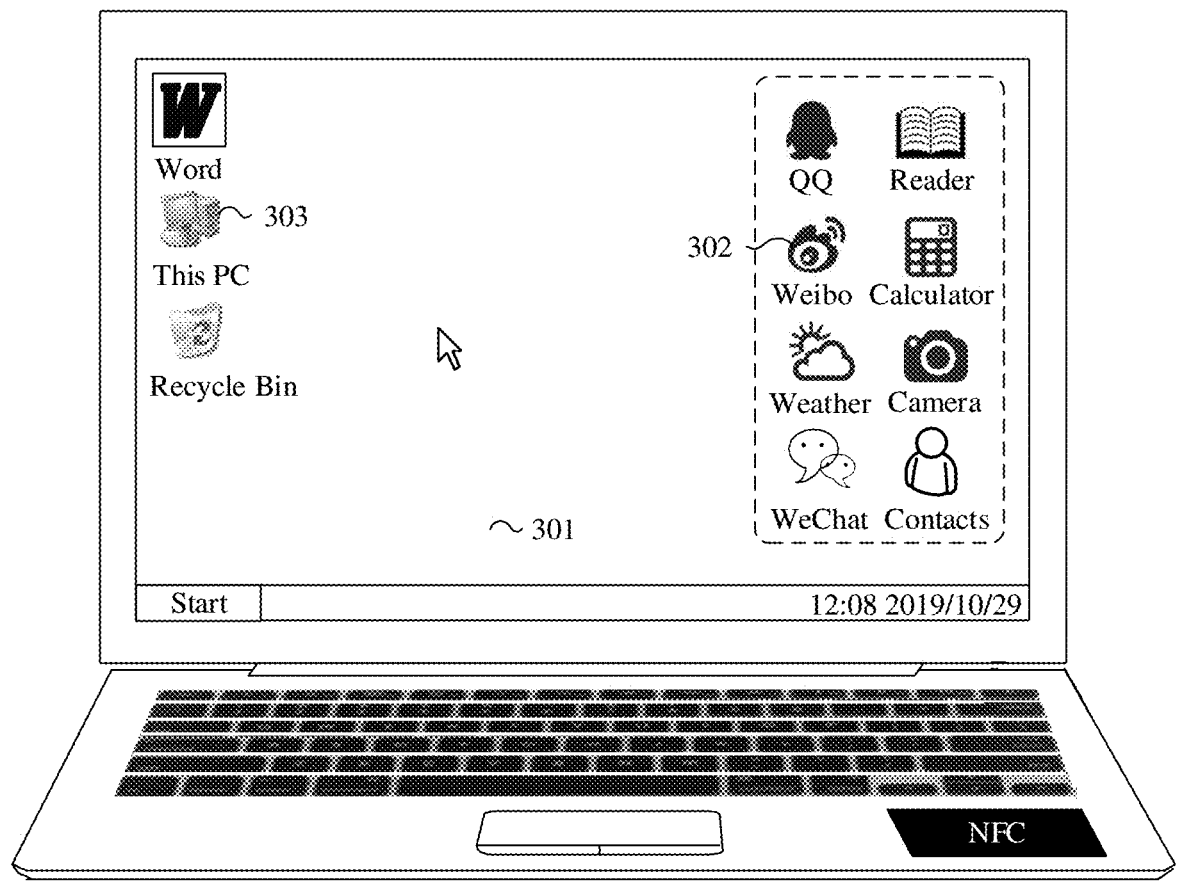
FIG. 3B is a schematic diagram 3 of an application scenario of a multi-screen collaboration method according to an embodiment of this application.

Alternatively, as shown in FIG. 3B, when displaying the icons 302 of the N applications of the mobile phone on the desktop 301, the notebook computer may further display, on the desktop 301, an icon or icons 303 of one or more applications or files originally installed on the notebook computer. In a word, the application list projected by the mobile phone onto the notebook computer for display does not affect an application list originally displayed by the notebook computer. Therefore, on the notebook computer, the user not only can operate the icon 303 to use a related function of the notebook computer, but also can operate the icon 302 to use a related function of the mobile phone. This implements a multi-screen collaboration function. When the mobile phone serves as the source device, an application installed on the mobile phone may be referred to as a source device application. When the notebook computer serves as a destination device, an application installed on the notebook computer may be referred to as a destination application.

Figure 3C:
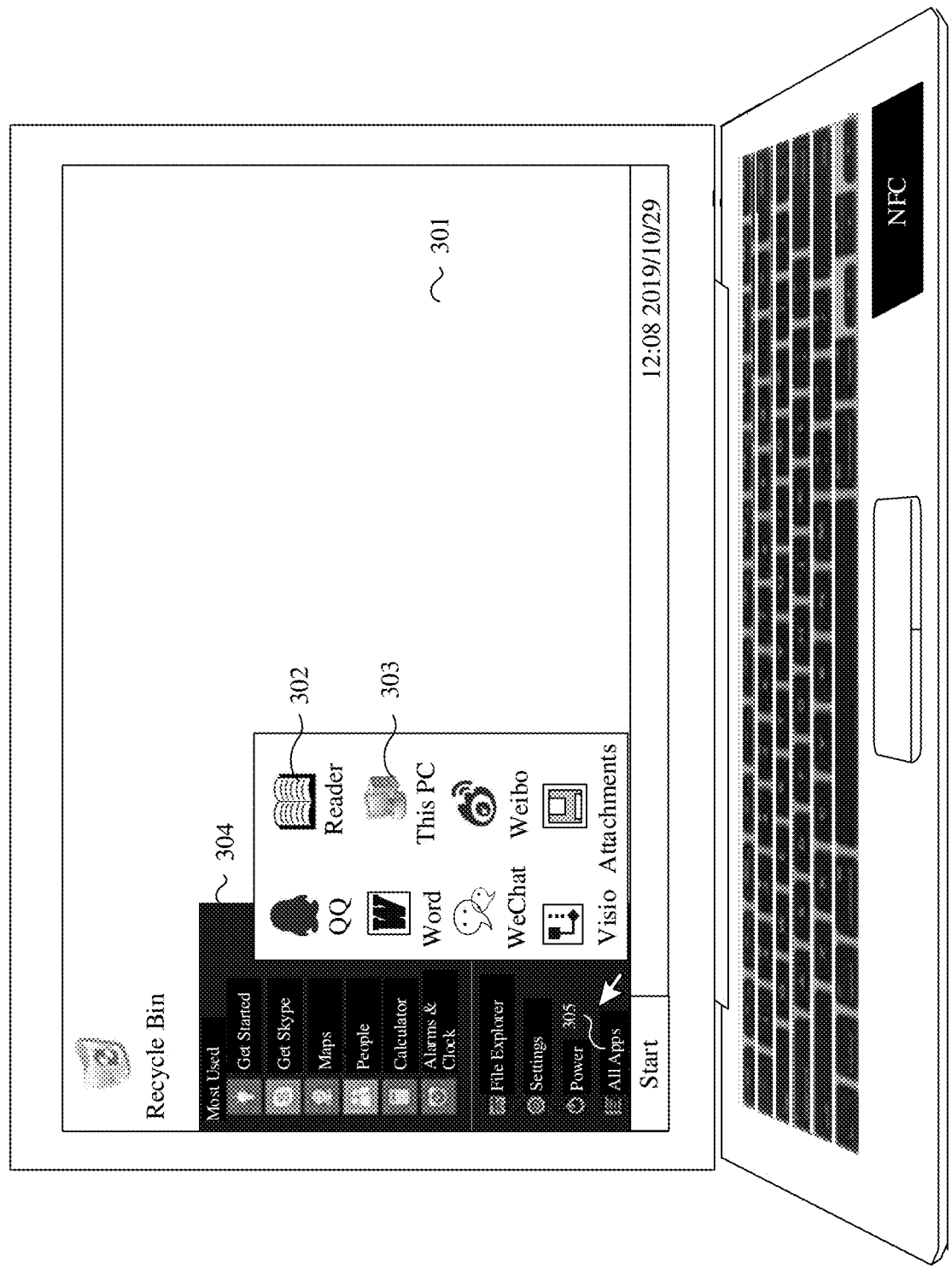
FIG. 3C is a schematic diagram 4 of an application scenario of a multi-screen collaboration method according to an embodiment of this application.

Alternatively, as shown in FIG. 3C, the notebook computer may display the icons 302 in a start menu 304 of the notebook computer. After the user opens the start menu 304 of the notebook computer, the notebook computer may simultaneously display, in an "All Apps" option 305, the icon or icons 303 of the one or more applications or files installed on the notebook computer and the icons 302 of the N applications of the mobile phone. In this way, the user can conveniently use, on the notebook computer, an application provided by the notebook computer and an application provided by the mobile phone. This implements undifferentiated integration of functions of a plurality of devices on the destination device.

Certainly, the notebook computer may alternatively display the icon 302 at a location such as on a taskbar, a tile, a toolbar, or a status bar of the notebook computer. This is not limited in embodiments of this application.

Figure 4A:
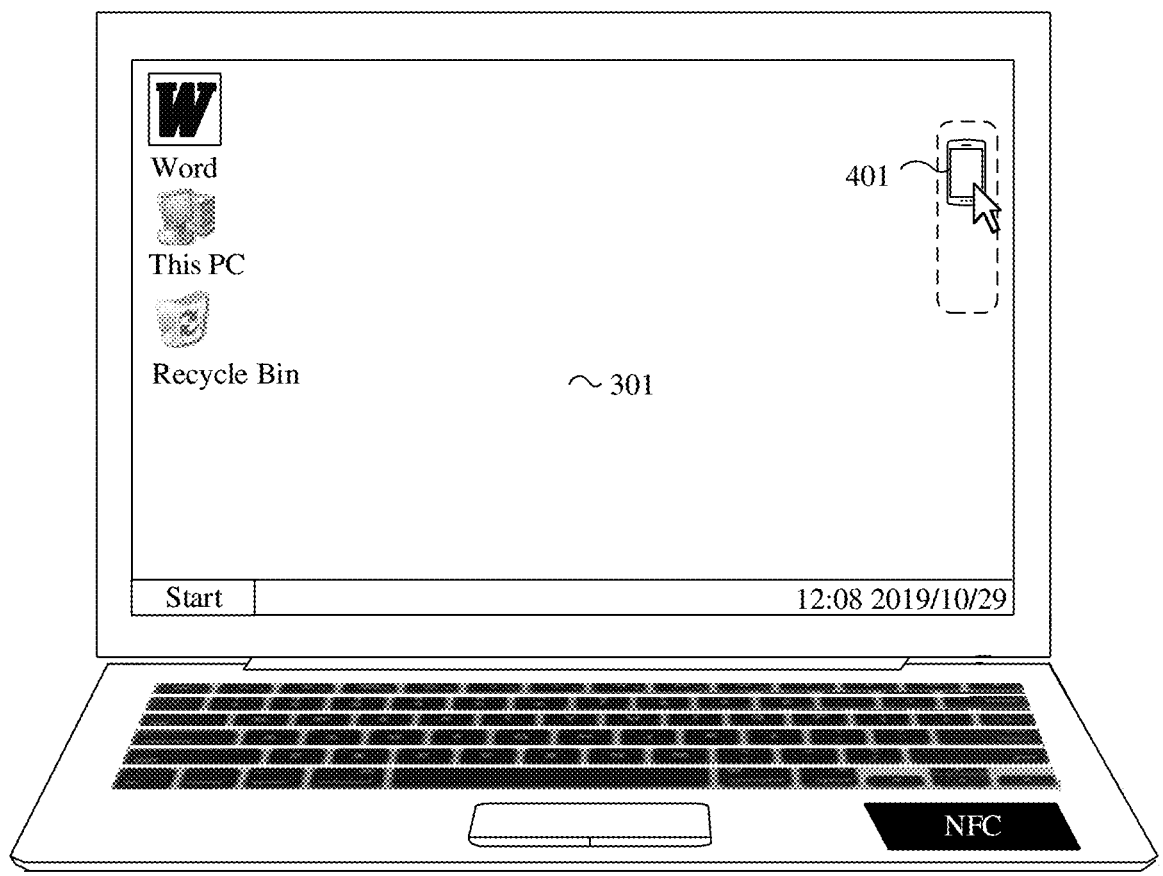
FIG. 4(a) and FIG. 4(b) are a schematic diagram 5 of an application scenario of a multi-screen collaboration method according to an embodiment of this application.
Figure 4B:
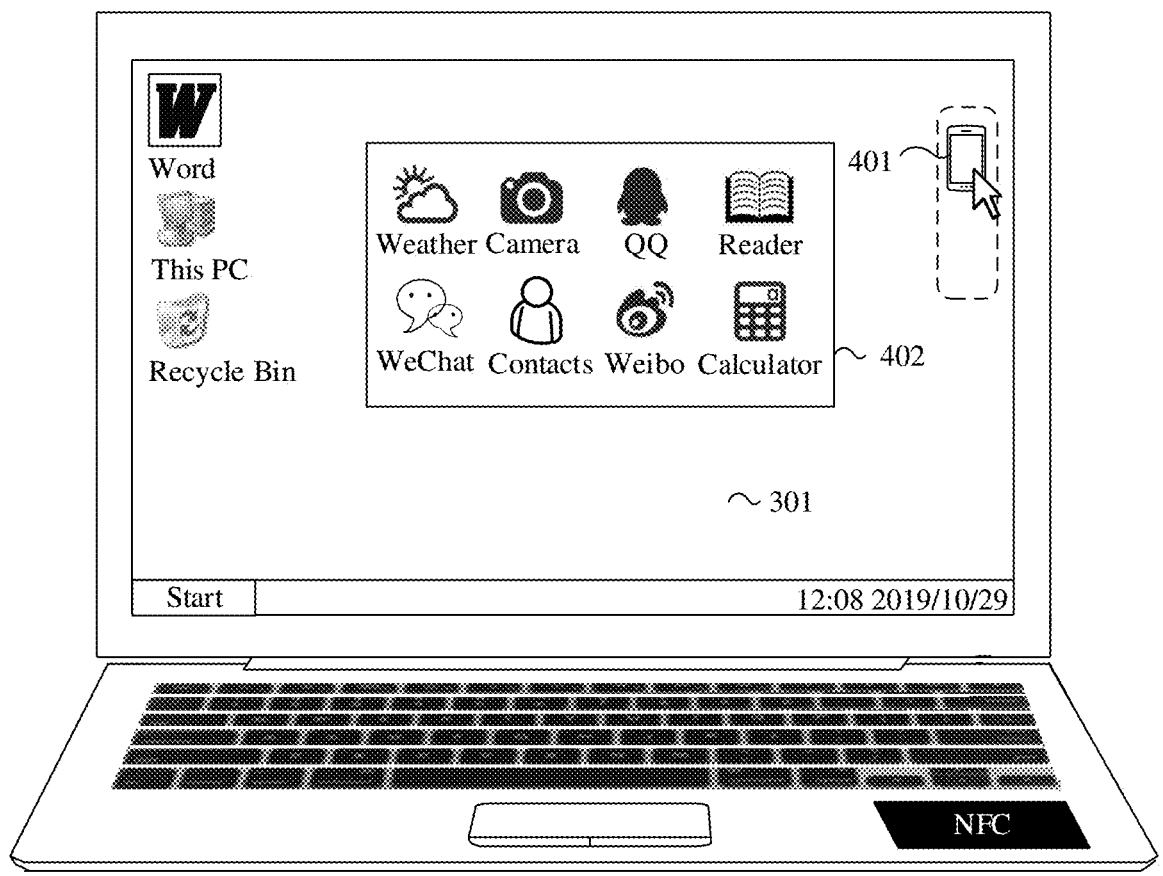

Alternatively, as shown in FIG. 4(a), after receiving the application information sent by the mobile phone, the notebook computer may display a button 401 on the desktop 301. If the notebook computer detects that the user selects the button 401, as shown in FIG. 4(b), the notebook computer may display the corresponding application list 402 based on the application information of the N applications, where the application list 402 may include the icons of the N applications. Specific display forms and locations of the application list 402 and the button 401 are not limited in embodiments of this application. For example, a presentation bar (for example, a dock bar) may be added on the desktop 301 of the notebook computer to display the button 401, or the button 401 may be displayed on the original taskbar, toolbar, or start menu on the desktop 301 of the notebook computer.

In addition, when the mobile phone sends the application information to the notebook computer, and the notebook computer displays the icon 302, the mobile phone may continue to normally run an application that is originally being run on the mobile phone, or the mobile phone may be in a screen-off or screen-locked state.

Subsequently, if the user needs to use a related function of an application 1 of the mobile phone on the notebook computer, the user may select an icon of the application 1 from the icons 302 of the N applications displayed on the notebook computer. Further, the notebook computer may send, to the mobile phone, an identifier of the application 1 corresponding to the icon selected by the user, to trigger the mobile phone to run the application 1, and send display data that is of an application interface of the application 1 and that is generated during running of the application 1 to the notebook computer for display, so that the application 1 of the mobile phone (that is, the source device) is displayed on the notebook computer (that is, the destination device) in cross-screen mode at an application granularity. This facilitates the user in using an application of the source device on the destination device, and implements a multi-screen collaboration function.

Certainly, if the user further needs to open an application 2 of the mobile phone on the notebook computer, the user may continue to select an icon of the application 2 on the desktop 301, to trigger the mobile phone to continue to have the application 2 to be displayed on the notebook computer in cross-screen mode by using the foregoing method. In this way, the user can open a plurality of applications of the mobile phone (that is, the source device) on the notebook computer (that is, the destination device). This implements display of a plurality of applications in cross-screen mode.

It can be learned that, according to the multi-screen collaboration method provided in this application, an application interface that is being displayed by the source device (for example, the mobile phone) is not projected onto the destination device (for example, the notebook computer) for display, but the application information of the N applications installed on the source device is sent to the destination device, so that the destination device can present the application list of the applications installed on the source device to the user. In this way, all device capabilities of the source device can be presented on the destination device in a form of the application list, and the user can open and display, on the destination device according to a requirement of the user, one or more applications installed on the source device. This implements display of one or more applications on different devices in cross-screen mode, and improves user experience.

In addition, when displaying the application list of the source device, the destination device may still display an application and a file of the destination device. In a word, device capabilities of both the source device and the destination device can be presented on the destination device, the user can conveniently use, on the destination device, an application provided by the destination device and an application provided by the source device, and an application function provided by the source device can be effectively integrated with that on the destination device without affecting normal running of the destination device. This improves user experience in multi-screen interaction and collaboration.

In subsequent embodiments, a specific method for displaying one or more applications of the source device on the destination device in cross-screen mode is described with reference to specific examples. Therefore, details are not described herein.

Figure 5:
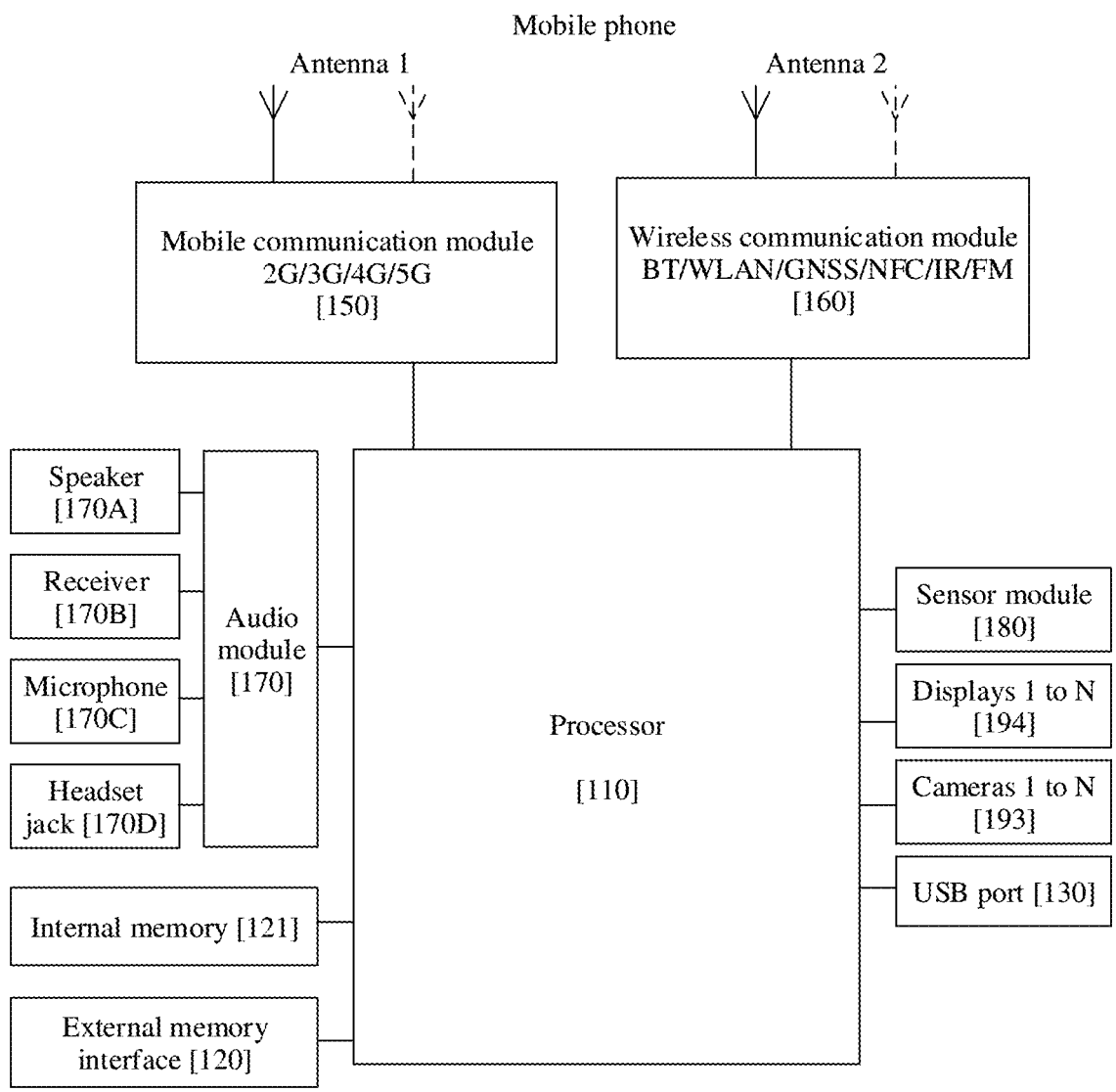
FIG. 5 is a schematic diagram 1 of a structure of an electronic device according to an embodiment of this application.

For example, a mobile phone serves as the first electronic device 101 in the multi-screen collaboration system 200. FIG. 5 is a schematic diagram of a structure of the mobile phone.

The mobile phone may include a processor 110, an external memory interface 120, an internal memory 121, a universal serial bus (USB) port 130, an antenna 1, an antenna 2, a mobile communication module 150, a wireless communication module 160, an audio module 170, a speaker 170A, a receiver 170B, a microphone 170C, a headset jack 170D, a sensor module 180, and the like.

It may be understood that the structure shown in this embodiment of the present invention does not constitute a specific limitation on the mobile phone. In some other embodiments of this application, the mobile phone may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (application processor, AP), a modem processor, a graphics processing unit (GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a cache. The memory may store instructions or data that has been just used or is cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

A wireless communication function of the mobile phone may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the mobile phone may be configured to cover one or more communication bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a wireless communication solution that includes 2G/3G/4G/5G or the like and that is applied to the mobile phone. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave through the antenna 1 for radiation. In some embodiments, at least some functional modules of the mobile communication module 150 may be disposed in the processor 110. In some embodiments, at least some functional modules of the mobile communication module 150 and at least some modules of the processor 110 may be disposed in a same device.

The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the mobile phone. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the mobile phone, the antenna 1 and the mobile communication module 150 are coupled, and the antenna 2 and the wireless communication module 160 are coupled, so that the mobile phone can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The mobile phone implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode or an active-matrix organic light emitting diode (AMOLED), a flexible light-emitting diode (FLED), a mini-LED, a micro-LED, a micro-OLED, quantum dot light-emitting diodes (QLED), or the like. In some embodiments, the mobile phone may include one or N displays 194, where N is a positive integer greater than 1.

The mobile phone may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto a photosensitive element. The photosensitive element may be a charge-coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the mobile phone may include one or N cameras 193, where N is a positive integer greater than 1.

The digital signal processor is configured to process a digital signal, and may process another digital signal in addition to the digital image signal. For example, when the mobile phone selects a frequency, the digital signal processor is configured to perform Fourier transform on frequency energy, and the like.

The video codec is configured to compress or decompress a digital video. The mobile phone may support one or more video codecs. In this way, the mobile phone can play or record videos in a plurality of coding formats, for example, moving picture experts group (MPEG)-1, MPEG-2, MPEG-3, and MPEG-4.

The external memory interface 120 may be configured to connect to an external storage card such as a micro SD card, to extend a storage capability of the mobile phone. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to execute various function applications and data processing of the mobile phone. The internal memory 121 may include a program storage area and a data storage area. The program storage area may store an operating system, an application required by at least one function (for example, a sound playing function or an image playing function), and the like. The data storage area may store data (for example, audio data or an address book) created during use of the mobile phone, and the like. In addition, the internal memory 121 may include a high-speed random access memory, or may include a nonvolatile memory, for example, at least one magnetic disk storage device, a flash memory, or a universal flash storage (UFS).

The mobile phone may implement audio functions such as music playing and recording functions through the audio module 170, the speaker 170A, the receiver 170B, the microphone 170C, the headset jack 170D, and the application processor.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The mobile phone may be used to listen to music or answer a hands-free call by using the speaker 170A.

The receiver 170B, also referred to as an "earpiece", is configured to convert an electrical audio signal into a sound signal. When a call is answered or voice information is received by using the mobile phone, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C, to input a sound signal to the microphone 170C. At least one microphone 170C may be disposed in the mobile phone. In some other embodiments, two microphones 170C may be disposed in the mobile phone, to collect a sound signal and further implement a noise reduction function. In some other embodiments, three, four, or more microphones 170C may alternatively be disposed in the mobile phone, to collect a sound signal, reduce noise, identify a sound source, implement a directional recording function, and the like.

The headset jack 170D is configured to connect to a wired headset. The headset jack 170D may be the USB port 130 or a 3.5 mm open mobile terminal platform (OMTP) standard interface or a cellular telecommunications industry association of the USA (CTIA) standard interface.

The sensor module 180 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

Certainly, the mobile phone may further include a charging management module, a power management unit, a battery, a button, an indicator, one or more SIM card interfaces, and the like. This is not limited in embodiments of this application.

A software system of the mobile phone may use a layered architecture, an event-driven architecture, a microkernel architecture, a microservice architecture, or a cloud architecture. In embodiments of this application, an Android system with a layered architecture is used as an example to describe the software structure of the mobile phone.

Figure 6:
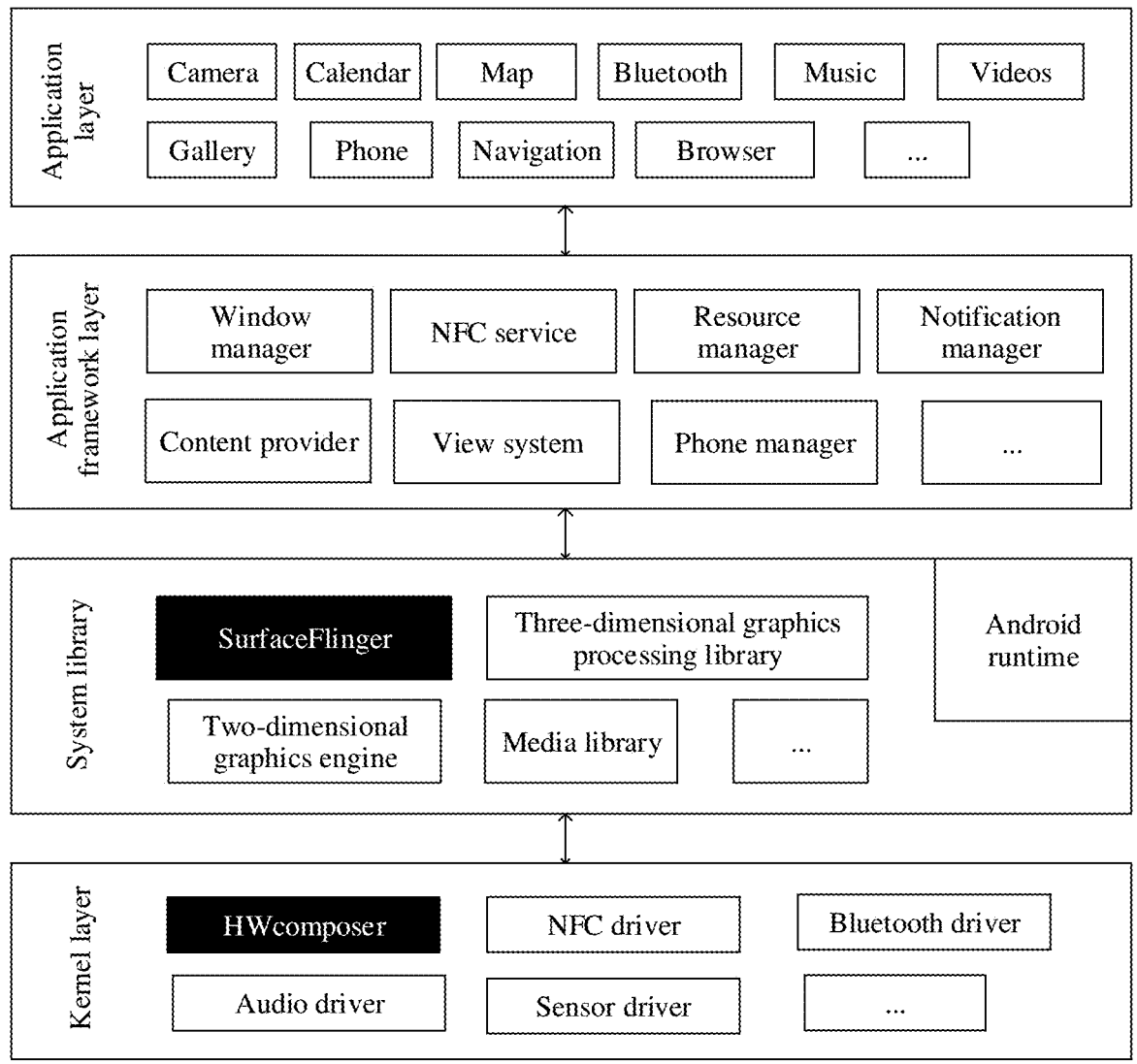
FIG. 6 is a schematic diagram of an architecture of an operating system in an electronic device according to an embodiment of this application.

FIG. 6 is a block diagram of a software structure of a mobile phone according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 6, apps (application) such as Phone, Memo, Browser, Contacts, Camera, Gallery, Calendar, Map, Bluetooth, Music, Videos, and Messages may be installed at the application layer.

The application framework layer provides an application programming interface (API) and a programming framework for an application at the application layer. The application framework layer includes some predefined functions.

As shown in FIG. 6, the application framework layer may include an NFC service, a window manager, a content provider, a view system, a phone manager, a resource manager, a notification manager, and the like.

After enabling an NFC function, the mobile phone may start to run the NFC service. When the mobile phone approaches or touches an electronic label or an NFC chip of another electronic device (for example, a notebook computer), the NFC service may invoke an NFC driver at the kernel layer to read information in the electronic label, and the mobile phone establishes a wireless communication connection to the another electronic device based on the information.

The window manager is configured to manage a window program. The window manager may be configured to obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system may be configured to construct a display interface of an application. Each display interface may include one or more controls. Generally, the controls may include interface elements such as an icon, a button, a menu, a tab, a text box, a dialog box, a status bar, a navigation bar, and a widget (Widget).

The phone manager is configured to provide a communication function of the mobile phone, for example, management of a call status (including answering, declining, or the like).

The resource manager provides various resources for an application, such as a localized character string, an icon, a picture, a layout file, and a video file.

The notification manager enables an application to display notification information on a status bar, and may be configured to convey a notification type message, where the displayed notification information may automatically disappear after a short pause without user interaction. For example, the notification manager is configured to notify download completion, a message reminder, and the like. The notification manager may alternatively be a notification that appears on a status bar on the top of the system in a form of a graph or scroll bar texts, for example, a notification of an application that is run in the background, or may be a notification that appears on the screen in a form of a dialog window. For example, text information is displayed on the status bar, an alert sound is played, vibration is generated, or the indicator light blinks.

As shown in FIG. 6, the system library may include a plurality of functional modules, for example, Surface-Flinger, a media library, a three-dimensional graphics processing library (for example, OpenGL ES), and a 2D graphics engine (for example, SGL).

The SurfaceFlinger is configured to: manage a display subsystem and provide integration of 2D and 3D layers for a plurality of applications. The media library supports playback and recording of a plurality of commonly used audio and video formats, static image files, and the like. The media library may support a plurality of audio and video coding formats, such as MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The Android runtime includes a core library and a virtual machine. The Android runtime is responsible for scheduling and management of the Android system.

The core library includes two parts: a function that needs to be invoked in Java language, and a core library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The kernel layer is a layer between hardware and software. The kernel layer includes at least HWcomposer, a camera driver, an audio driver, a sensor driver, and the like. This is not limited in embodiments of this application.

Figure 7:
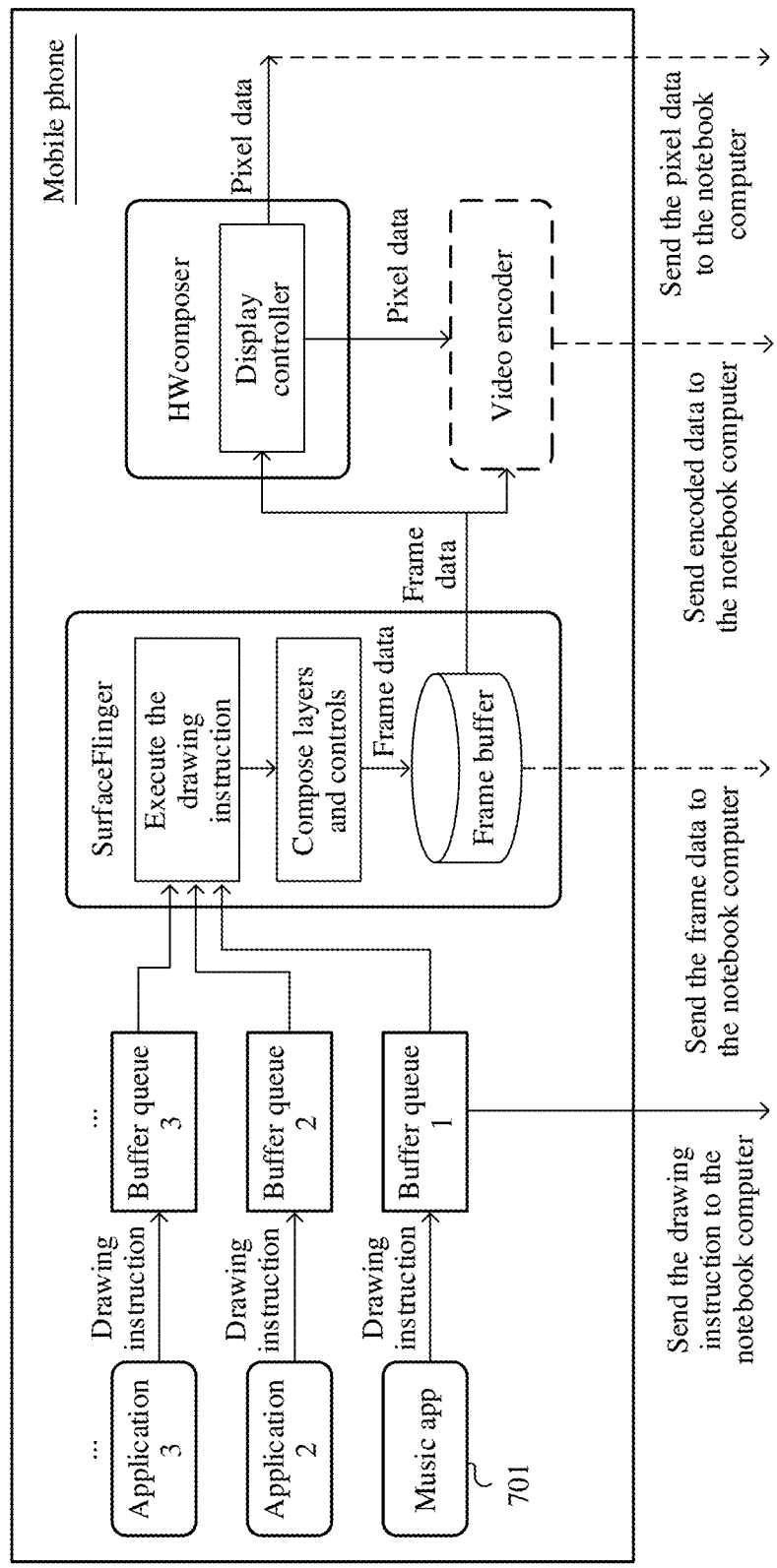
FIG. 7 is a schematic flowchart of processing display data in a multi-screen collaboration method according to an embodiment of this application.

In embodiments of this application, as shown in FIG. 7, after the application layer starts to run an application (for example, a music app 701), the mobile phone may allocate a corresponding buffer queue such as a buffer queue 1 to the music app 701. The buffer queue 1 is used to buffer a drawing instruction such as an openGL instruction generated during running of the music app 701. For example, during running of the music app 701, the window manager and the view system at the application framework layer may be invoked to generate drawing instructions for all controls and layers in an application interface of the music app 701, and the application interface of the music app 701 may be drawn by executing these drawing instructions. In this case, after these drawing instructions are generated for the music app 701 in real time, these drawing instructions may be pushed into the corresponding buffer queue 1 for storage. Similarly, the mobile phone may run a plurality of applications (for example, an application 2 and an application 3 shown in FIG. 7) at the application layer, and a drawing instruction generated for each application during running of each application may be stored in a corresponding buffer queue.

Still as shown in FIG. 7, a drawing instruction in a buffer queue may be sent to the SurfaceFlinger in the system library, and the SurfaceFlinger may draw a corresponding layer and control by executing the drawing instruction in each buffer queue. In addition, the SurfaceFlinger may compose these layers and controls to obtain each frame of frame data (which may also be referred to as graphics data) of an application interface. For example, the frame data may be in an RGB format (where R represents red, G represents green, and B represents blue). For example, the SurfaceFlinger may invoke hardware such as the GPU to perform the composition to obtain the frame data of the application interface, or may use a software module having a graphics composition capability to perform the composition to obtain the frame data of the application interface. The SurfaceFlinger may store each frame of generated frame data in a frame buffer for output or display.

Still as shown in FIG. 7, the frame data in the frame buffer may be sent to the HWcomposer at the kernel layer. A display controller in the HWcomposer may convert the frame data of the application interface into pixel data that can be directly displayed on a display. The pixel data may also be in an RGB format. If an application to which the pixel data belongs is an application that is being run in the foreground, the HWcomposer may send the generated pixel data to a display of the mobile phone, so that the application interface of the application can be displayed on the display based on the pixel data.

In some embodiments, still as shown in FIG. 7, the mobile phone may further include a video encoder (Media Encoder). The video encoder may obtain frame data output by the SurfaceFlinger, or may obtain pixel data output by the HWcomposer. The video encoder may be configured to encode and compress the frame data output by the SurfaceFlinger or the pixel data output by the HWcomposer. In subsequent embodiments, data obtained through encoding and compression by the video encoder may be referred to as encoded data, and a data amount of the encoded data may be greatly reduced compared with that of the frame data and the pixel data that are not encoded and compressed. For example, the encoded data may be in a YUV format (where Y represents luminance, and U and V represent chrominance).

In embodiments of this application, that the mobile phone (that is, a source device) projects installed N applications onto a notebook computer (that is, a destination device) is still used as an example. When detecting that a user opens one of the N applications (for example, the music app 701) on the notebook computer, the notebook computer may send an identifier of the music app 701 to the mobile phone, to indicate the mobile phone to project the application interface of the music app 701 onto the notebook computer for display.

In this case, the mobile phone may start to run the music app 701 at the application layer. In a process of running the music app 701, as shown in FIG. 7, a set of drawing instructions that are of the application interface of the music app 701 and that are generated during running of the music app 701 may be stored in the buffer queue 1 corresponding to the music app 701. Then, the mobile phone may send the set of drawing instructions that are stored in the buffer queue 1 in real time to the notebook computer. Then, the notebook computer may draw the application interface of the music app 701 on a desktop of the notebook computer based on the drawing instructions. In this way, the mobile phone projects the music app 701 onto the notebook computer for display.

Alternatively, when the mobile phone projects the music app 701 onto the notebook computer, still as shown in FIG. 7, the mobile phone may send frame data that is of the application interface of the music app 701 and that is generated in the SurfaceFlinger during running of the music app 701 to the notebook computer. Then, the notebook computer may draw the application interface of the music app 701 on the desktop of the notebook computer based on the frame data. In this way, the mobile phone projects the music app 701 onto the notebook computer for display.

Alternatively, when the mobile phone projects the music app 701 onto the notebook computer, still as shown in FIG. 7, the mobile phone may send pixel data that is of the application interface of the music app 701 and that is generated in the HWcomposer during running of the music app 701 to the notebook computer. Then, the notebook computer may draw the application interface of the music app 701 on the desktop of the notebook computer based on the pixel data. In this way, the mobile phone projects the music app 701 onto the notebook computer for display.

Alternatively, when the mobile phone projects the music app 701 onto the notebook computer, still as shown in FIG. 7, the mobile phone may send encoded data output by the video encoder during running of the music app 701 to the notebook computer. Then, after decoding the encoded data, the notebook computer may draw the application interface of the music app 701 on the desktop of the notebook computer based on decoded data. In this way, the mobile phone projects the music app 701 onto the notebook computer for display.

Similarly, if the user opens, on the notebook computer, a plurality of applications installed on the mobile phone, the mobile phone may run each application by using the foregoing method, and send display data (where the display data may be the foregoing drawing instruction, frame data, pixel data, or encoded data) that is of an application interface of each application and that is generated during running of each application to the notebook computer for display. This implements display of the plurality of applications in cross-screen mode.

In addition, when the mobile phone serves as the source device and projects an application onto the destination device (for example, the notebook computer), the mobile phone may run the application in the foreground of the mobile phone, to synchronously display an application interface of the application with the destination device. Alternatively, the mobile phone may run the application in the background of the mobile phone. In this case, the mobile phone may display an application interface of another application in the foreground or may be in a screen-off state. In other words, when the mobile phone projects an application interface of an application onto the destination device, the mobile phone does not need to synchronously display the application interface of the application on the mobile phone, and the user can normally use the mobile phone to implement a related function provided by the mobile phone.

The following describes in detail a multi-screen collaboration method provided in embodiments of this application with reference to the accompanying drawing.

Figure 8:
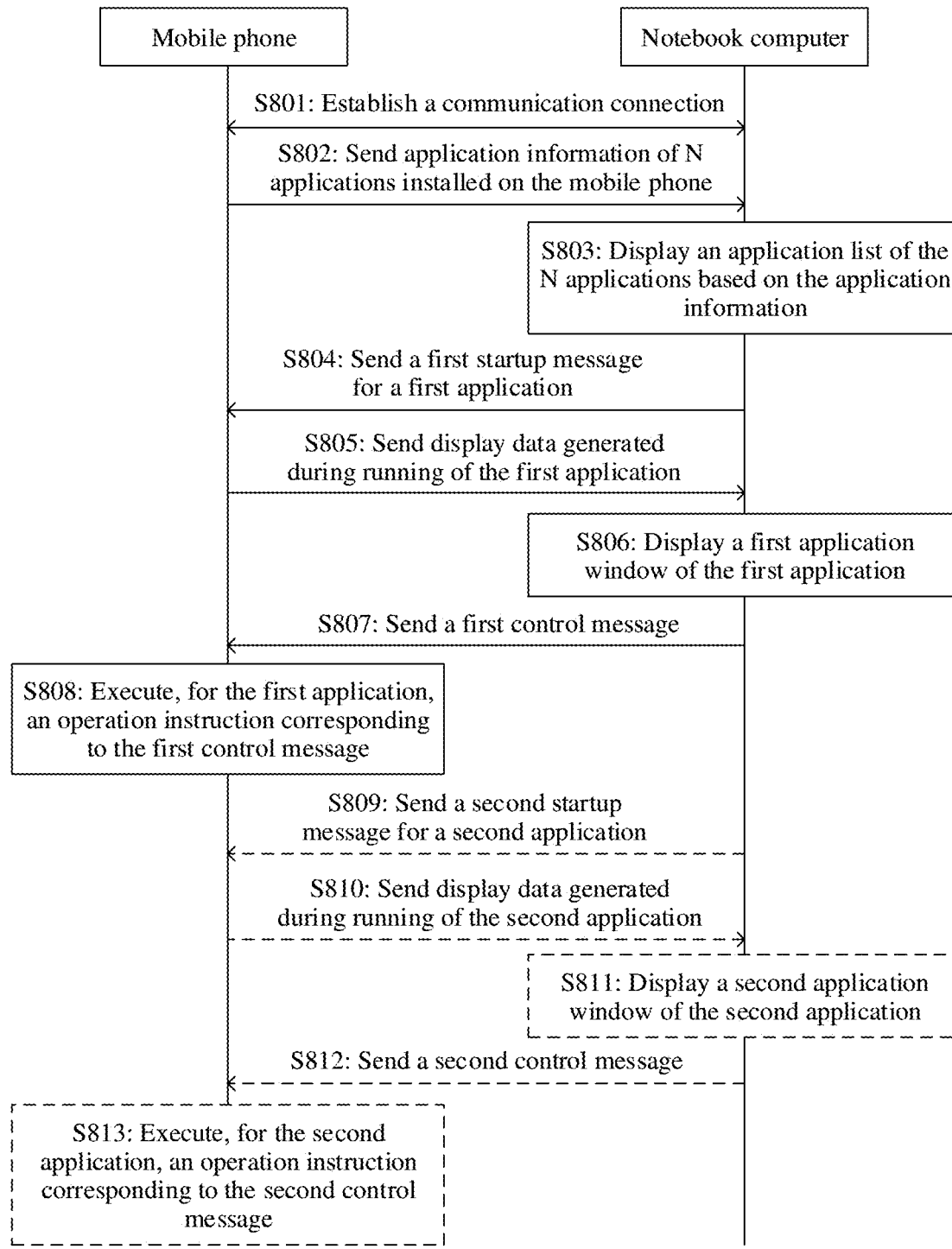
FIG. 8 is a schematic flowchart of a multi-screen collaboration method according to an embodiment of this application.

As shown in FIG. 8, for example, a user projects an application of a mobile phone (that is, a source device) onto a notebook computer (that is, a destination device) for display. A multi-screen collaboration method provided in an embodiment of this application may include the following steps.

S801: The mobile phone establishes a communication connection to the notebook computer.

The communication connection may be a wireless communication connection such as a Wi-Fi connection, a Bluetooth connection, a P2P connection, an NFC connection, or a cellular network-based data connection. Alternatively, the communication connection may be a wired connection. For example, the mobile phone and the notebook computer may be connected by using a data cable or a dock device. This is not limited in this embodiment of this application.

For example, an NFC chip or an electronic label may be disposed on the notebook computer, and device information of the notebook computer, for example, a MAC address of the notebook computer, is stored in the NFC chip or the electronic label. Further, after enabling an NFC function, the mobile phone may obtain the device information of the notebook computer by approaching or touching the NFC chip or the electronic label on the notebook computer. Then, the mobile phone may establish the communication connection such as a Bluetooth connection, a Wi-Fi connection, or a P2P connection to the notebook computer based on the device information.

For another example, a preset QR code may be displayed on the notebook computer, and the QR code includes device information of the notebook computer. In this case, the mobile phone may alternatively obtain the device information of the notebook computer by reading the QR code on the notebook computer. Then, the mobile phone may establish the communication connection such as a Bluetooth connection, a Wi-Fi connection, or a P2P connection to the notebook computer based on the device information.

Certainly, the user may alternatively create a Wi-Fi hotspot by using the mobile phone, and have the notebook computer connected to the Wi-Fi hotspot created by using the mobile phone, to establish the communication connection between the mobile phone and the notebook computer. A specific manner of establishing the communication connection between the mobile phone and the notebook computer is not limited in this embodiment of this application.

S802: The mobile phone sends application information of N applications installed on the mobile phone to the notebook computer.

The N applications may be all or some applications installed on the mobile phone. For example, the N applications may be all applications installed on the mobile phone, the N applications may be all third-party applications installed by the user on the mobile phone, or the N applications may be applications whose frequencies of use by the user in a latest week are greater than a preset value. This is not limited in this embodiment of this application.

For example, after the mobile phone detects that a communication connection is established to another device (for example, the notebook computer), the mobile phone may be triggered to obtain an identifier (for example, a package name of an application) and an icon of each of the currently installed N applications. Further, the mobile phone may send these identifiers and icons of the applications to the notebook computer as the application information through the communication connection.

Alternatively, the mobile phone may periodically maintain an application list of installed applications. For example, when the user installs a new application on the mobile phone or uninstalls an installed application from the mobile phone, the mobile phone may update an identifier and an icon of an application in the application list. Then, after the mobile phone establishes the communication connection to the notebook computer, the mobile phone may send an identifier and an icon of each application in a latest application list to the notebook computer as the application information through the communication connection.

In addition, in addition to the identifier and the icon of each of the N applications, the application information may further include a parameter related to the application such as a running status or a frequency of use of the application. For example, when a WeChat app of the mobile phone is being run on the mobile phone, a running status of the WeChat app may be 01; or when a music app of the mobile phone is not run on the mobile phone, a running status of the music app may be 00. For another example, when a start frequency or running time of the WeChat app of the mobile phone in a latest week is greater than a preset value, a frequency of use of the WeChat app may be set to high; or when a start frequency or running time of a fitness app of the mobile phone in a latest week is less than a preset value, a frequency of use of the fitness app may be set to low.

It should be noted that the mobile phone may send the application information of the N applications to the notebook computer after detecting, for the first time, that the mobile phone establishes the communication connection to the notebook computer, and the notebook computer may store the application information. Subsequently, after the mobile phone establishes a communication connection to the notebook computer again, the mobile phone may no longer send the application information to the notebook computer. Alternatively, after the mobile phone establishes a communication connection to the notebook computer again, in addition to the application information of the N applications, the mobile phone may send application information of one or more applications that need to be displayed on the notebook computer in cross-screen mode to the notebook computer. For example, in addition to the application information of the N applications, the mobile phone may send application information of a newly installed application to the notebook computer.

S803: The notebook computer displays an application list of the N applications based on the application information.

In step S803, after receiving the application information of the N applications sent by the mobile phone, the notebook computer may display, on a display of the notebook computer based on the application information, the application list including the N applications installed on the mobile phone. This implements projection of the application list installed on the mobile phone onto the notebook computer for display.

Figure 9A:
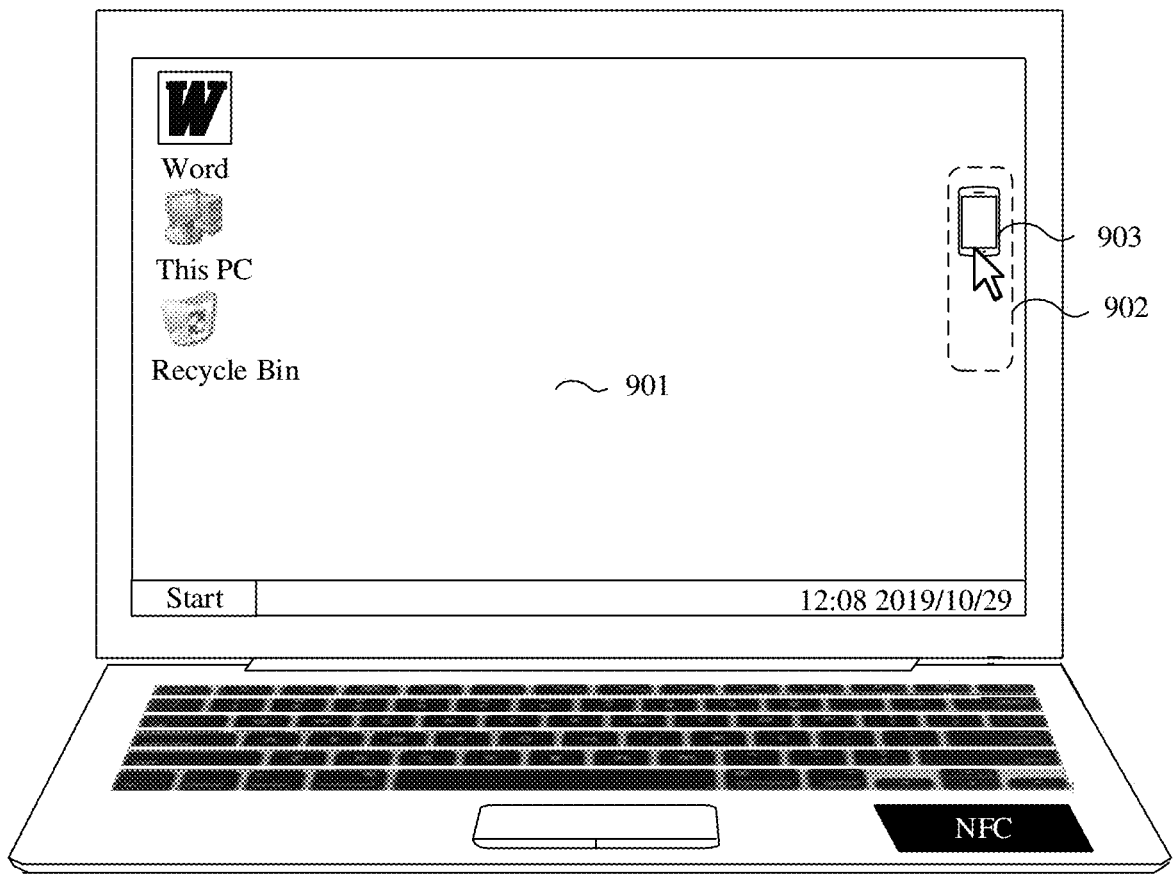
FIG. 9(a) and FIG. 9(b) are a schematic diagram 6 of an application scenario of a multi-screen collaboration method according to an embodiment of this application.
Figure 9B:
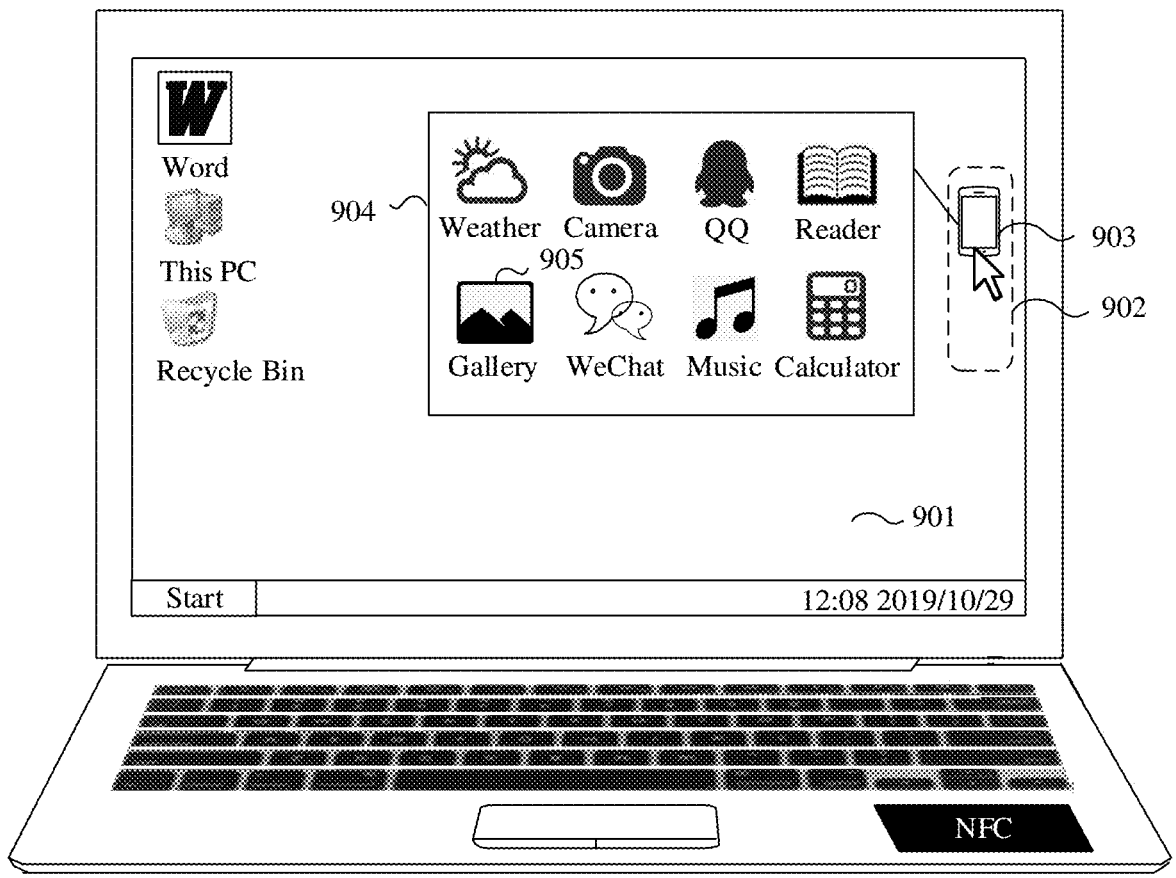

For example, as shown in FIG. 9(a), after receiving the application information sent by the mobile phone, the notebook computer may display a preset presentation bar, for example, a dock bar 902, on a desktop 901 of the notebook computer. A button 903 used for opening the application list of the mobile phone is disposed on the dock bar 902. If detecting that the user selects the button 903, for example, detecting that the user moves a cursor and clicks the button 903 by operating a mouse of the notebook computer, as shown in FIG. 9(b), the notebook computer may display, on the desktop 901, the icon of each application carried in the application information of the N applications, to form the application list 904 of the N applications. In this way, the notebook computer may present various device capabilities of the mobile phone (that is, the source device) to the user by using the application list 904, and the user may select, from the application list 904, a specific application that needs to be projected onto the notebook computer. When displaying the application list 904, the notebook computer may further normally display a file or an application of the notebook computer. To be specific, the user may also open the file or the application of the notebook computer on the notebook computer. In other words, normal running of the notebook computer is not affected when the mobile phone projects the application list 904 onto the notebook computer.

Figure 10:
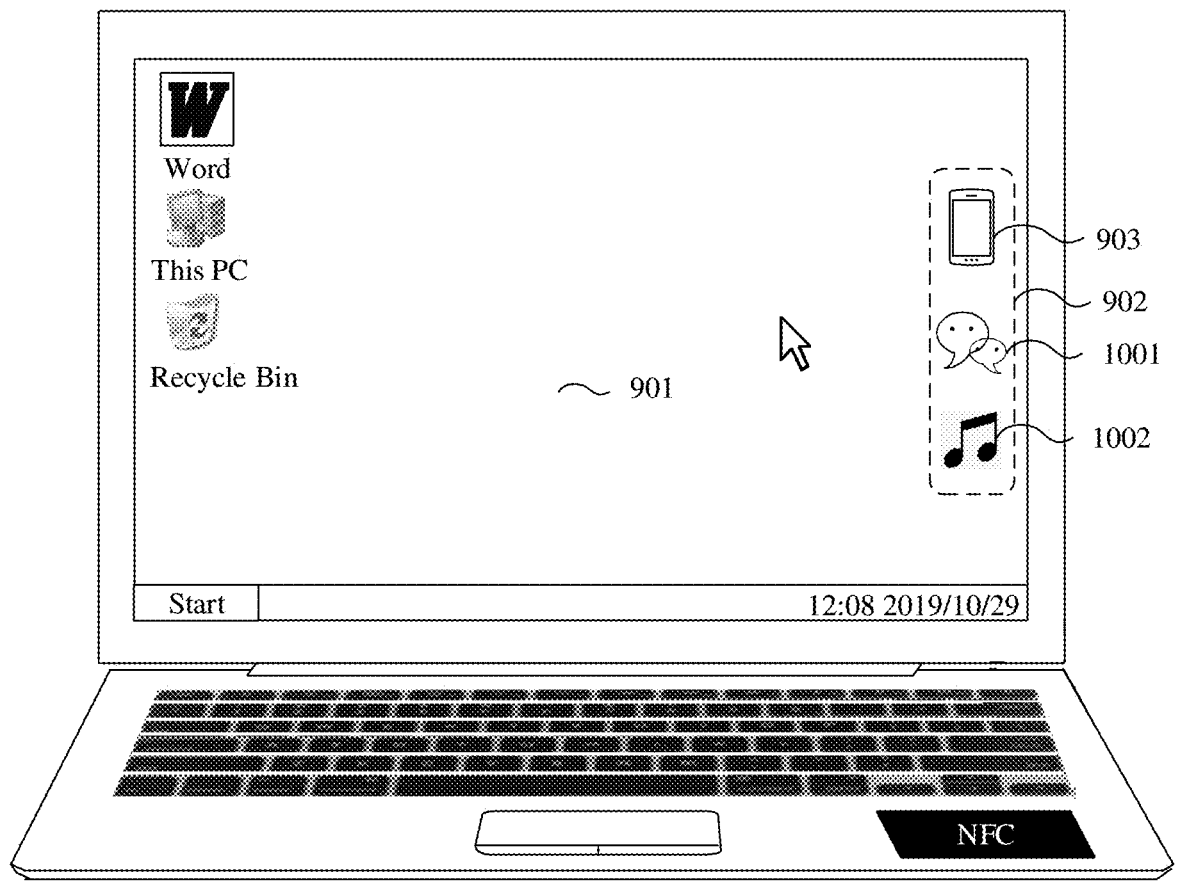
FIG. 10 is a schematic diagram 7 of an application scenario of a multi-screen collaboration method according to an embodiment of this application.

In some embodiments, the application information sent by the mobile phone further includes a running status of an application. For example, applications that are being run on the mobile phone include a WeChat app and a music app. In this case, as shown in FIG. 10, the notebook computer may further display, on the dock bar 902, an icon 1001 of the WeChat app and an icon 1002 of the music app that are being run on the mobile phone. In other words, the notebook computer (that is, the destination device) may implement projection of an icon of an application that is being run on the mobile phone (that is, the source device) onto an interface displayed by the notebook computer, so that the user can quickly open, on the notebook computer, the application that is being run on the mobile phone.

Figure 11A:
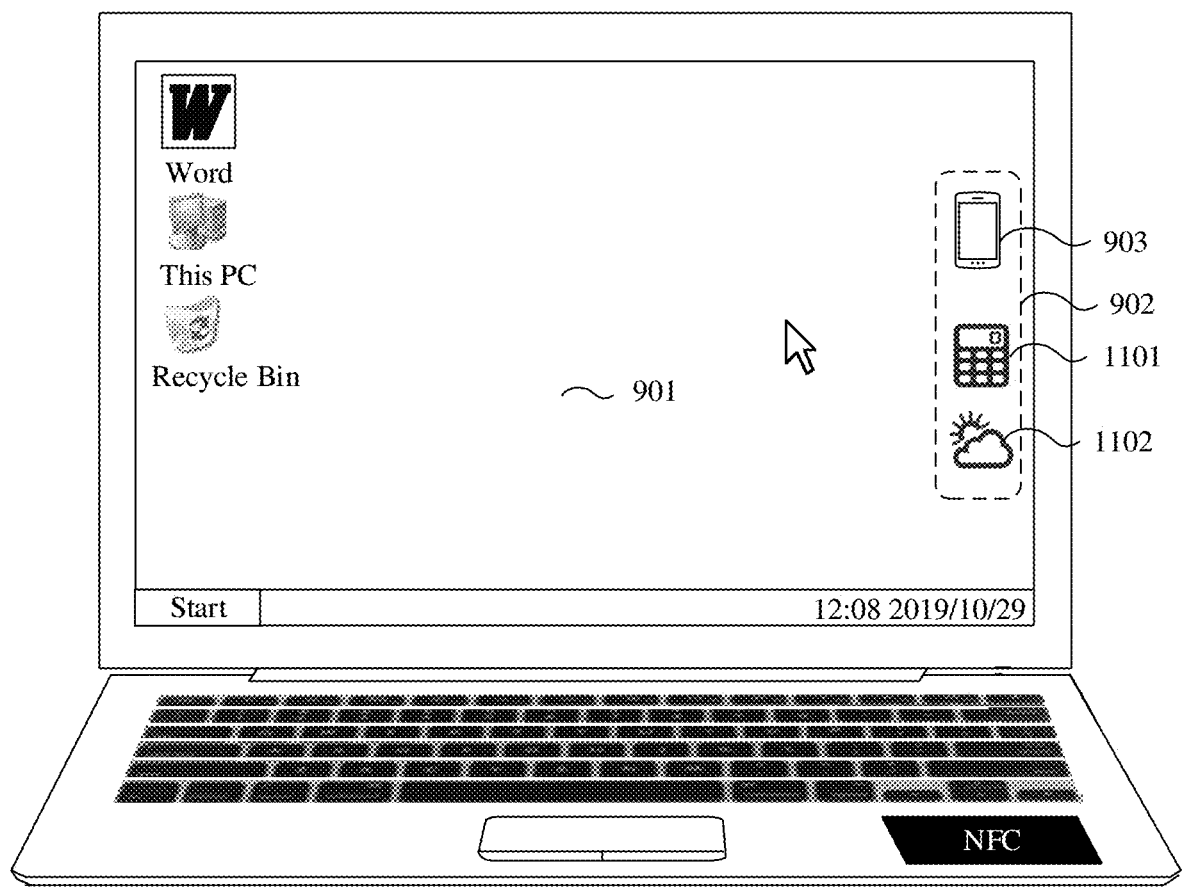
FIG. 11(a) and FIG. 11(b) are a schematic diagram 8 of an application scenario of a multi-screen collaboration method according to an embodiment of this application.

In some embodiments, the application information sent by the mobile phone further includes a frequency of use of an application. For example, applications whose frequencies of use are greater than a preset value include a calculator app and a weather app. In this case, as shown in FIG. 11(a), the notebook computer may further display, on the dock bar 902, icons of these frequently used applications, that is, an icon 1101 of the calculator app and an icon 1102 of the weather app. In this way, the user can conveniently and quickly find and open, on the notebook computer, an application frequently used on the mobile phone.

Figure 11B:
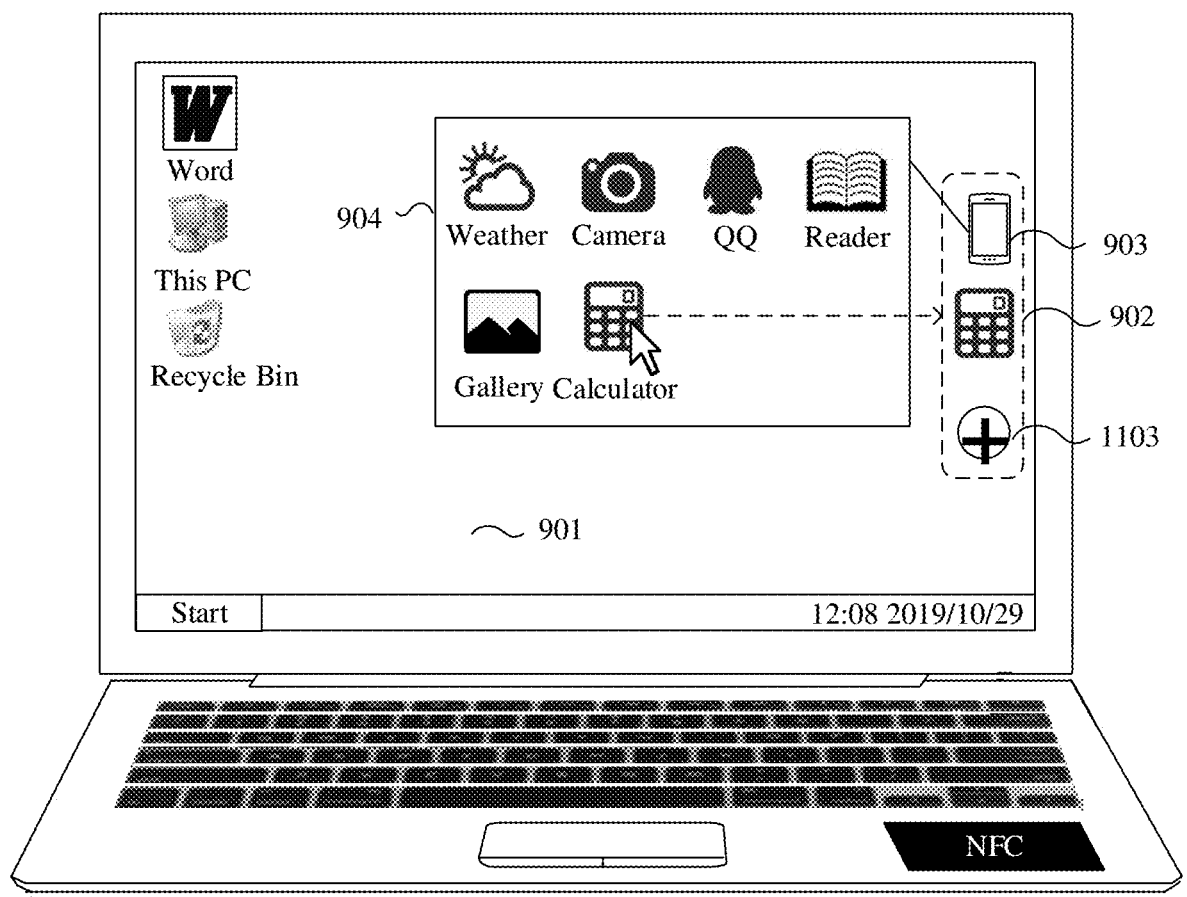

Alternatively, the user may manually add, to the dock bar 902, an icon or icons of one or more applications of the mobile phone that need to be displayed. As shown in FIG. 11(b), after the user selects the button 903 to open the application list 904 on the notebook computer, the user may drag an icon or icons of one or more applications in the application list 904 to the dock bar 902 by using the cursor, and the mobile phone may add an icon of a corresponding application to the dock bar 902 for display in response to a drag operation of the user. Certainly, an add button 1103 may be set on the dock bar 902 on the notebook computer, and the user may manually add an icon of an application to the dock bar 902 by using the add button 1103.

In addition, the dock bar 902 may be displayed on the desktop 901 of the notebook computer in a floating manner, and the user may manually adjust a location or a size of the dock bar 902 on the desktop 901. Alternatively, if the notebook computer does not detect any operation input by the user on the dock bar 902 within a specific time, the notebook computer may hide the dock bar 902 on the desktop 901.

It may be understood that a person skilled in the art may set another button on the dock bar 902 based on actual experience or an actual application scenario. For example, a settings button may be displayed on the dock bar 902, to set parameters for cross-screen display from the mobile phone to the notebook computer. For another example, an exit button may also be displayed on the dock bar 902, to exit a current cross-screen display task from the mobile phone to the notebook computer. This is not limited in this embodiment of this application.

Certainly, in addition to displaying the N applications projected by the mobile phone on the dock bar 902 on the notebook computer, the notebook computer may alternatively display the application list including the N applications on another location such as the desktop or a taskbar. This is not limited in this embodiment of this application.

It can be learned that, based on steps S801 to S803, the mobile phone may project the application list including the N installed applications onto the notebook computer for display, so that the user can operate an application in the application list according to a requirement of the user in a cross-screen display process to implement a corresponding function. In a process of performing steps S801 to S803, the mobile phone may continue to display an application that is originally being run in the foreground, or may be in a screen-off or screen-locked state. In other words, a process in which the mobile phone projects the application list onto the notebook computer does not affect an original running status of the mobile phone, and the user can still normally operate various applications and functions of the mobile phone.

S804: In response to an operation of selecting a first application from the application list by the user, the notebook computer sends a first startup message to the mobile phone, where the first startup message includes an identifier of the first application.

For example, after the notebook computer displays the application list 904 on the desktop 901, the user may operate the cursor on the notebook computer to select a specific application that currently needs to be projected onto the notebook computer for display. For example, still as shown in FIG. 9(*b*), if the user wants to project a gallery app of the mobile phone onto the notebook computer for display, the user may operate the cursor on the notebook computer to click an icon 905 of the gallery app. After detecting that the user clicks the icon 905 of the gallery app in the application list 904, the notebook computer may include an identifier (for example, a package name) of the gallery app in the first startup message and send the first startup message to the mobile phone, to indicate the mobile phone to project the gallery app onto the notebook computer for display.

Certainly, if an icon of an application that the user expects to open is located on the dock bar 902, the user may also operate the cursor to click the icon of the corresponding application on the dock bar 902. Similarly, in response to the operation of clicking the icon of the application by the user, the notebook computer may send a corresponding startup message to the mobile phone, where the startup message includes an identifier of the specific application clicked by the user.

S805: In response to the first startup message, the mobile phone sends display data that is of an application interface of the first application and that is generated during running of the first application to the notebook computer.

After the mobile phone receives the first startup message sent by the notebook computer, the mobile phone may query, based on an identifier that is of the first application (for example, the gallery app) and that is carried in the first startup message, whether an application that is being run on the mobile phone includes the gallery app.

Figure 12A:
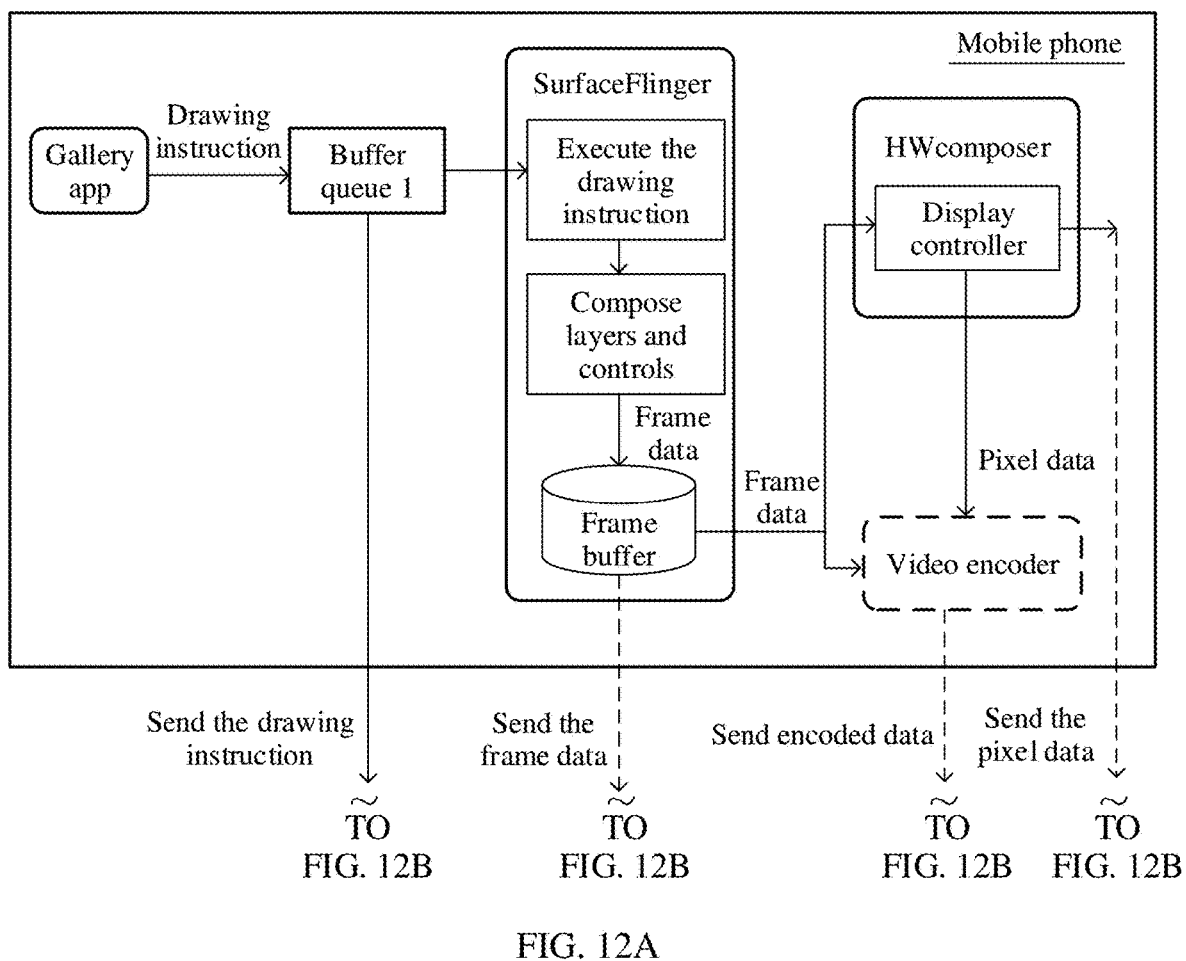
FIG. 12A and FIG. 12B are a schematic diagram 9 of an application scenario of a multi-screen collaboration method according to an embodiment of this application.

If the mobile phone is running the gallery app, as shown in FIG. 12A, a drawing instruction that is of an application interface of the gallery app and that is generated during running of the gallery app is stored in a corresponding buffer queue (buffer queue) 1. For example, the drawing instruction may be specifically a GPU rendering instruction, an openGL instruction, or the like. The application interface corresponding to the gallery app may be drawn by executing the drawing instruction. In this case, in step S805, the mobile phone may send the drawing instruction stored in the buffer queue 1 in real time to the notebook computer as display data of the gallery app, so that the notebook computer can draw the application interface of the gallery app based on the drawing instruction.

Alternatively, still as shown in FIG. 12A, during running of the gallery app, SurfaceFlinger may be invoked to execute the drawing instruction in the buffer queue 1, to obtain, through composition, each frame of frame data of the application interface of the gallery app. For example, the frame data may be specifically display data in an RGB format. The frame data is usually stored in a frame buffer (frame buffer) of the SurfaceFlinger. In this case, in step S805, the mobile phone may send the frame data of the gallery app in the frame buffer to the notebook computer as display data of the gallery app, so that the notebook computer can draw the application interface of the gallery app based on the frame data.

Alternatively, still as shown in FIG. 12A, the frame data output by the SurfaceFlinger during running of the gallery app is finally sent to HWcomposer, and the HWcomposer converts the frame data into pixel data that can be displayed on the display, for example, pixel data in an RGB format. In this case, in step S805, the mobile phone may send the pixel data of the gallery app output by the HWcomposer in real time to the notebook computer as display data of the gallery app, so that the notebook computer can draw the application interface of the gallery app based on the pixel data.

Alternatively, still as shown in FIG. 12A, the frame data output by the SurfaceFlinger (or the pixel data output by the HWcomposer) during running of the gallery app may be encoded and compressed by a video encoder, to generate encoded data corresponding to the application interface of the gallery app, for example, display data in a YUV format. In this case, in step S805, the mobile phone may send the encoded data of the gallery app output by the video encoder in real time to the notebook computer as display data of the gallery app, so that the notebook computer can draw the application interface of the gallery app after decoding the encoded data, and a data transmission amount can be reduced during data transmission.

Correspondingly, if the mobile phone has not started running of the gallery app when receiving the first startup message, the mobile phone may first create an application process for the gallery app to start the gallery app. For example, the mobile phone may start the gallery app in the foreground, or may start the gallery app in the background. Further, still as shown in FIG. 12A, during running of the gallery app after being started, the mobile phone may send the drawing instruction, the frame data, the encoded data, or the pixel data generated for the gallery app to the notebook computer in real time as the display data of the gallery app, so that the notebook computer can draw the application interface of the gallery app based on the display data.

S806: The notebook computer displays a first application window of the first application based on the display data.

Figure 12B:
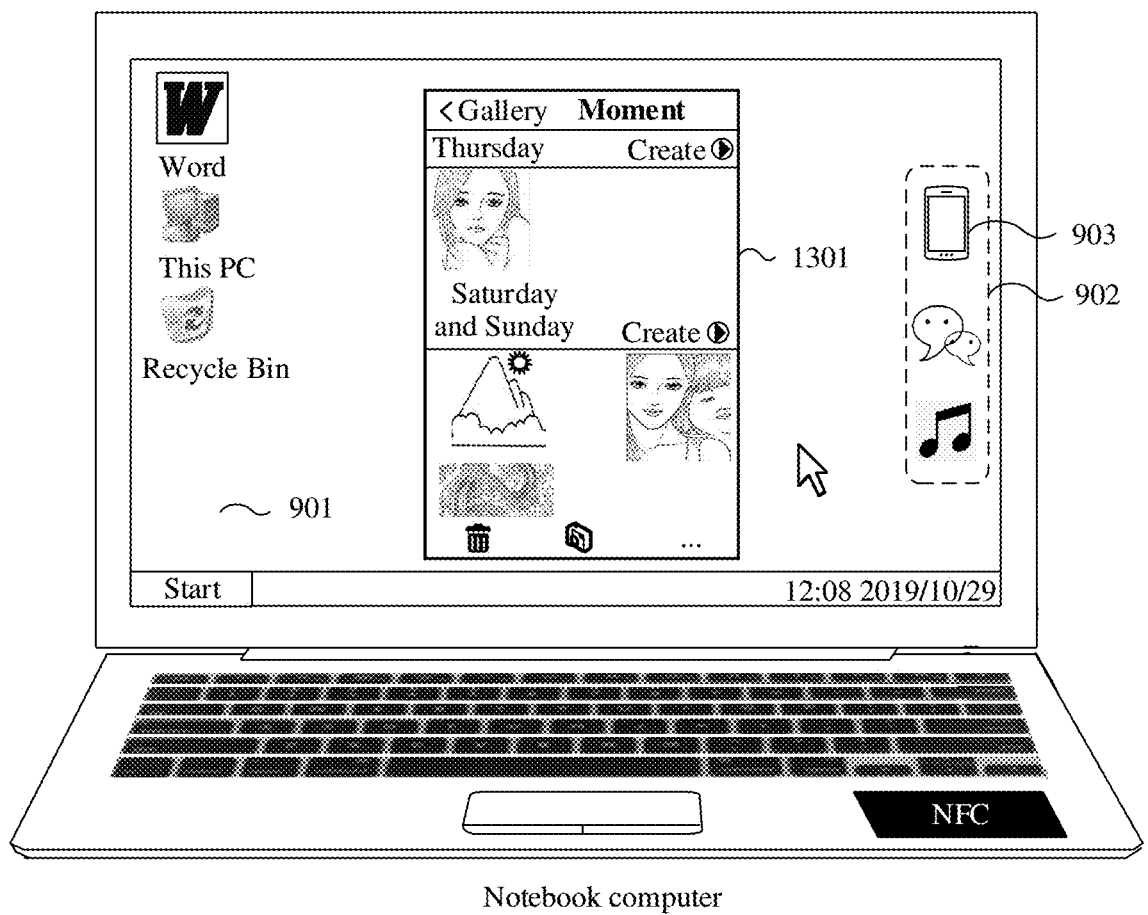

That the mobile phone projects the gallery app onto the notebook computer is still used as an example. If the display data sent by the mobile phone is the drawing instruction generated during running of the gallery app, after receiving the drawing instruction, the notebook computer may execute the drawing instruction by using a display module such as a GPU or a graphics card of the notebook computer. In this case, as shown in FIG. 12B, the notebook computer may draw the application interface 1301 of the gallery app (which may also be referred to as an application window of the gallery app) on the desktop 901 by executing the drawing instruction. Because an application interface of the gallery app run on the mobile phone may be updated in real time, the mobile phone may send a new drawing instruction to the notebook computer in real time, and the notebook computer may continuously draw, on the desktop 901, an application interface displayed for the gallery app in real time.

Alternatively, if the display data sent by the mobile phone is the frame data generated during running of the gallery app, after receiving the frame data, the notebook computer may also draw the application interface of the gallery app based on the frame data by using a display module of the notebook computer, to obtain the application interface 1301 shown in FIG. 12B.

Alternatively, if the display data sent by the mobile phone is the pixel data generated during running of the gallery app, after receiving the pixel data, the notebook computer may also draw the application interface of the gallery app based on the pixel data by using a display module of the notebook computer, to obtain the application interface 1301 shown in FIG. 12B.

Alternatively, if the display data sent by the mobile phone is the encoded data generated during running of the gallery app, after receiving the encoded data, the notebook computer may first decode the received encoded data by using a video decoder (Media Decoder), and then the notebook computer may draw the application interface of the gallery app based on decoded data by using a display module of the notebook computer, to obtain the application interface 1301 shown in FIG. 12B.

Figure 13:
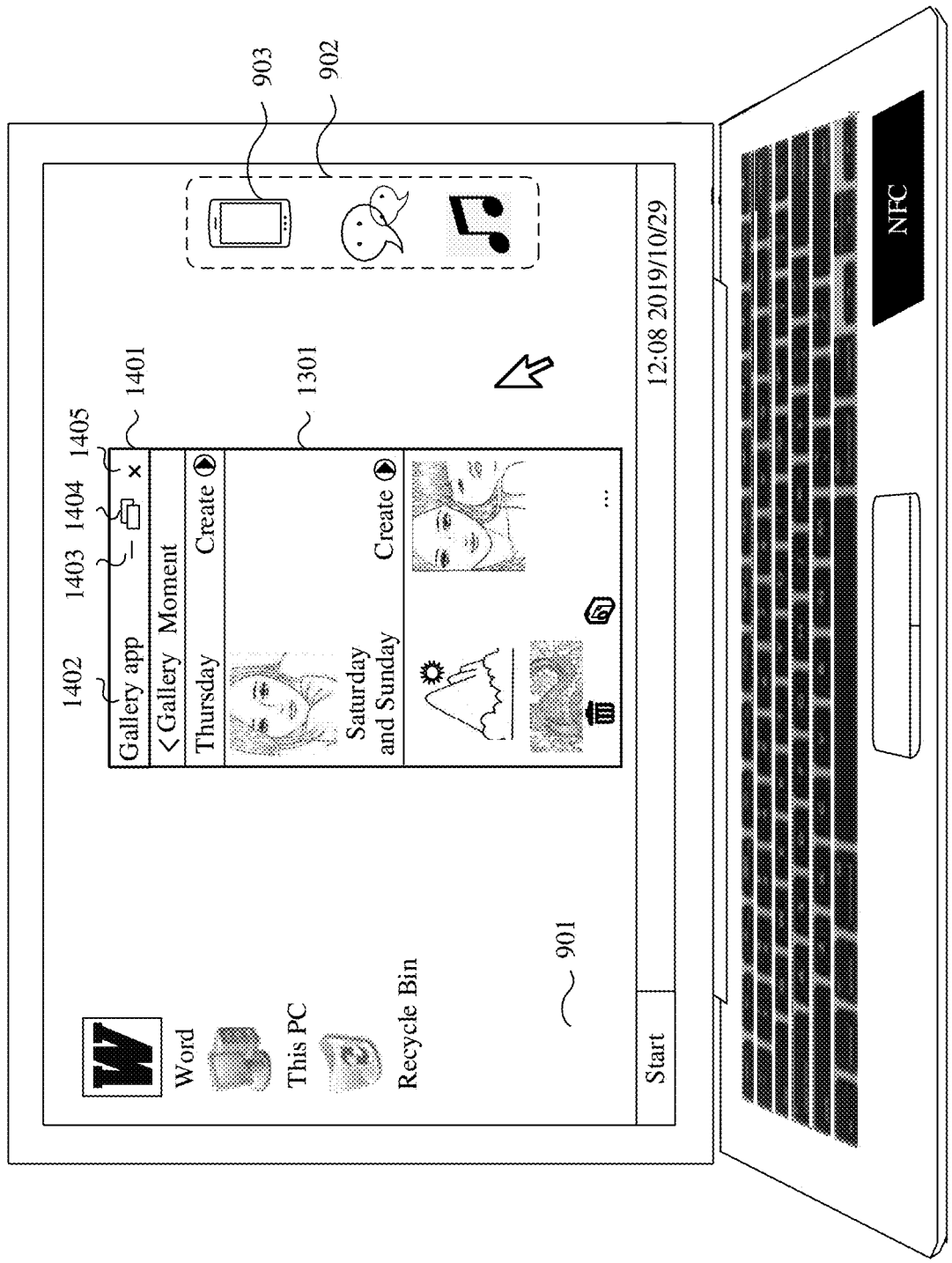
FIG. 13 is a schematic diagram 10 of an application scenario of a multi-screen collaboration method according to an embodiment of this application.

In some other embodiments, after the notebook computer draws the application interface 1301 of the gallery app based on the display data sent by the mobile phone, as shown in FIG. 13, the notebook computer may add a title bar 1401 to the application interface 1301, to display the application interface of the gallery app in a window form. The title bar 1401 and the application interface 1301 jointly form the application window of the gallery app. The title bar 1401 may include an application name 1402, a minimize button 1403, a maximize button 1404, a close button 1405, and the like. This is not limited in this embodiment of this application. Then, an application projected onto the notebook computer may be displayed in a display manner of an operating system of the notebook computer. This improves user experience.

In a word, based on steps S801 to S806, the mobile phone projects the application list of the mobile phone onto the notebook computer, so that the user can project a required targeted application of the mobile phone onto the notebook computer for display. This implements display of an application on different devices in cross-screen mode, and improves user experience in a cross-screen display scenario.

S807: In response to a first operation input by the user in the first application window, the notebook computer sends a corresponding first control message to the mobile phone.

That the mobile phone projects the gallery app onto the notebook computer is still used as an example. After the notebook computer displays the application window of the gallery app on the desktop 901, the user may operate the application window displayed on the notebook computer to control the gallery app that is run on the mobile phone. This implements various functions of a related application of the source device on the notebook computer (that is, the destination device).

For example, when drawing the application interface 1301 of the camera app based on the display data, the notebook computer may establish a correspondence between the application interface 1301 displayed on the notebook computer and a corresponding application interface of the camera app run on the mobile phone. For example, if a size of the application interface of the camera app sent by the mobile phone is 300*400, the notebook computer may draw the application interface 1301 based on the size of 300*400. Alternatively, the notebook computer may draw the application interface 1301 based on a specific scale ratio. For example, the notebook computer may draw the application interface 1301 based on a size of 600*800.

Figure 14:
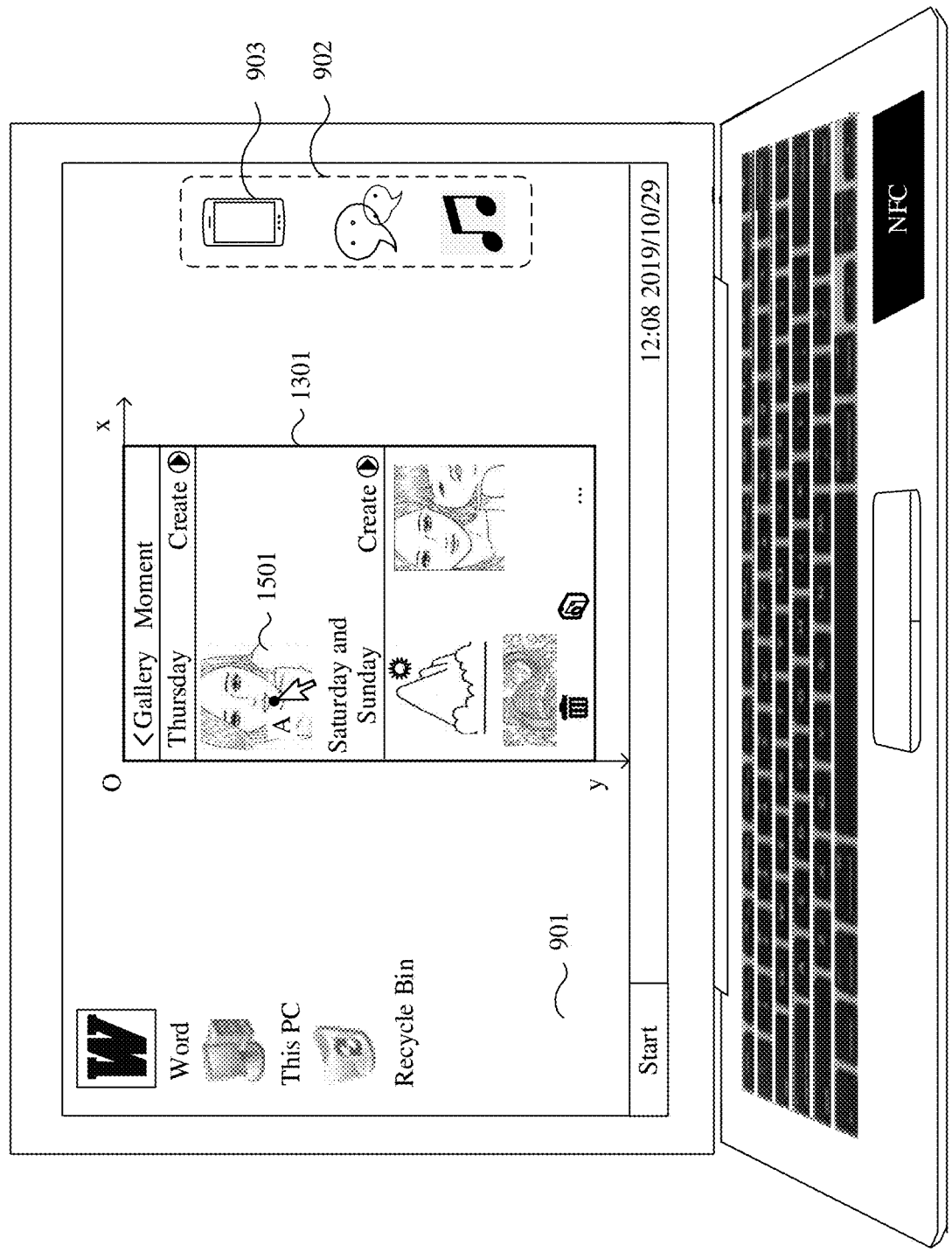
FIG. 14 is a schematic diagram 11 of an application scenario of a multi-screen collaboration method according to an embodiment of this application.

As shown in FIG. 14, the notebook computer may use an upper left vertex of the application interface 1301 as an origin O to establish a rectangular coordinate system. Because the application interface 1301 displayed on the notebook computer corresponds to the application interface of the camera app run on the mobile phone, the notebook computer may convert, based on the correspondence, any coordinates in the application interface 1301 into corresponding coordinates in the application interface of the camera app run on the mobile phone. When the notebook computer detects that the user inputs a click operation, a double-click operation, a drag operation, a mouse scrolling operation, a keyboard entry operation, or the like in the application interface 1301, the notebook computer may generate a corresponding control message and send the control message to the mobile phone.

The control message may include the identifier of the application to which the application interface 1301 belongs, for example, the package name of the gallery app, so that the mobile phone learns that the current control message is a control message for the gallery app. In addition, the control message may further include an operation type of an operation input by the user, for example, a click operation, a double-click operation, a drag operation, a mouse scrolling operation, or a keyboard entry operation.

When the operation type is indicated as a click operation or a double-click operation, the notebook computer may include, in a corresponding control message, coordinates corresponding to the click operation in the application window on the notebook computer. When the operation type is indicated as a drag operation, the notebook computer may include, in a corresponding control message, start coordinates and end coordinates corresponding to the drag operation in the application window on the notebook computer. If a size of the application interface 1301 of the gallery app displayed on the notebook computer is the same as a size of the application interface of the gallery app run on the mobile phone, the foregoing coordinates may be coordinates corresponding to the current operation in the rectangular coordinate system. Alternatively, if a size of the application interface 1301 of the gallery app displayed on the notebook computer is different from a size of the application interface of the gallery app run on the mobile phone, the notebook computer may convert the foregoing coordinates corresponding to the current operation in the rectangular coordinate system into corresponding coordinates in the application interface of the gallery app run on the mobile phone, and include the converted coordinates in the control message.

When the operation type is indicated as a mouse scrolling operation, the notebook computer may include a specific mouse scrolling amount in a corresponding control message. When the operation type is indicated as a keyboard entry operation, the notebook computer may include, in a corresponding control message, a specific character string entered by the user.

Alternatively, when the operation type is indicated as a drag operation, the notebook computer may include, in a series of control messages, coordinates of the cursor that are detected in real time at a specific detection frequency in the application window on the notebook computer, and send the series of control messages to the mobile phone. In this way, the mobile phone may respond to the operation of the user in the application interface 1301 in real time based on the coordinates in the series of control messages, to implement a corresponding function by controlling the gallery app.

Similarly, when the operation type is indicated as a mouse scrolling operation, the notebook computer may send a control message to the mobile phone each time the notebook computer detects that a mouse scroll wheel scrolls by one unit, to report a current mouse scrolling operation to the mobile phone in real time. Similarly, the mobile phone may respond to the mouse scrolling operation of the user in real time based on a series of received control messages, to perform a corresponding operation on the gallery app. In addition, to avoid impact caused by sending of a large quantity of control messages to the mobile phone in a short time to processing performance of the mobile phone, the notebook computer may set an upper limit (for example, 10 messages per second) for a quantity of control messages sent to the mobile phone per unit time. When the quantity of sent control messages exceeds the upper limit, the notebook computer may stop generating a corresponding control message or discard a redundant control message.

For example, still as shown in FIG. 14, if detecting that the user controls the cursor to click a point A of a photo 1501 in the application interface 1301, the notebook computer may convert coordinates (x, y) of the point A into corresponding coordinates A' in the application interface of the camera app run on the mobile phone. Then, the notebook computer may include an operation type "click operation" of the current operation, the coordinates of the point A', and the package name of the gallery app in the first control message, and send the first control message to the mobile phone. Subsequently, the mobile phone may report a corresponding input event to the gallery app based on the first control message, to trigger execution of a corresponding operation instruction for the gallery app.

The user not only can input a corresponding operation in the application interface 1301, but also can operate the title bar 1401 in the application interface 1301. For example, if detecting that the user clicks the minimize button 1403 on the title bar 1401, the notebook computer may display a minimized window of the gallery app on the dock bar 902 or the task bar on the desktop 901, and hide the application interface 1301. If detecting that the user clicks the maximize button 1404 on the title bar 1401, the notebook computer may display the application interface 1301 on the desktop 901 in tile mode. If detecting that the user clicks the close button 1405 on the title bar 1401, the notebook computer may send a close message to the mobile phone, to trigger the mobile phone to terminate the gallery app that is being run. In this case, the mobile phone no longer sends the display data generated for the gallery app to the notebook computer, and the notebook computer no longer continues to display the title bar 1401 and the application interface 1301.

In addition, alternatively, the user may manually adjust a location and the size of the application interface 1301 of the gallery app on the desktop 901. For example, if the user scales up the application interface 1301 on the desktop 901 by two times, the notebook computer may update a specific location of the application interface 1301 on the desktop 901. Then, when the notebook computer subsequently detects that the user inputs a corresponding operation in the application interface 1301, the notebook computer may decrease values of coordinates corresponding to the operation in the rectangular coordinate system by two times, to restore the operation to an operation in the application interface 1301 before being scaled up. Subsequently, the notebook computer may include, in a control message, the coordinate values obtained through decreasing by two times, and send the control message to the mobile phone.

S808: In response to the first control message, the mobile phone executes, for the first application, an operation instruction corresponding to the first control message.

That the user clicks the point A of the photo 1501 in the application interface 1301 is still used as an example. The first control message sent by the notebook computer may include the identifier of the gallery app, the operation type "click operation" of the current operation, and a click location that corresponds to the point A' on a display of the mobile phone. Then, the mobile phone may convert the first control message into a touch event of the user at the point A', and report the touch event to the gallery app. For the gallery app, after the gallery app receives the touch event, it may be understood that the user clicks the point A' on the gallery app that is being run, indicating that the user wants to open the photo 1501 corresponding to the point A' (that is, the corresponding point A on the notebook computer). In this case, for the gallery app, a corresponding function may be invoked to execute an operation instruction for opening the photo 1501.

When the operation instruction for opening the photo 1501 is executed for the gallery app, new display data (for example, the foregoing drawing instruction, frame data, or pixel data) is generated. In this case, the mobile phone may continue to send the new display data to the notebook computer by using the method described in steps S805 and S806, to trigger the notebook computer to update the application interface of the gallery app on the desktop 901. In this way, the user can operate content that is projected onto and displayed by the notebook computer (that is, the destination device). This implements various functions of a related application of the mobile phone (that is, the source device) on the destination device.

Figure 15A:
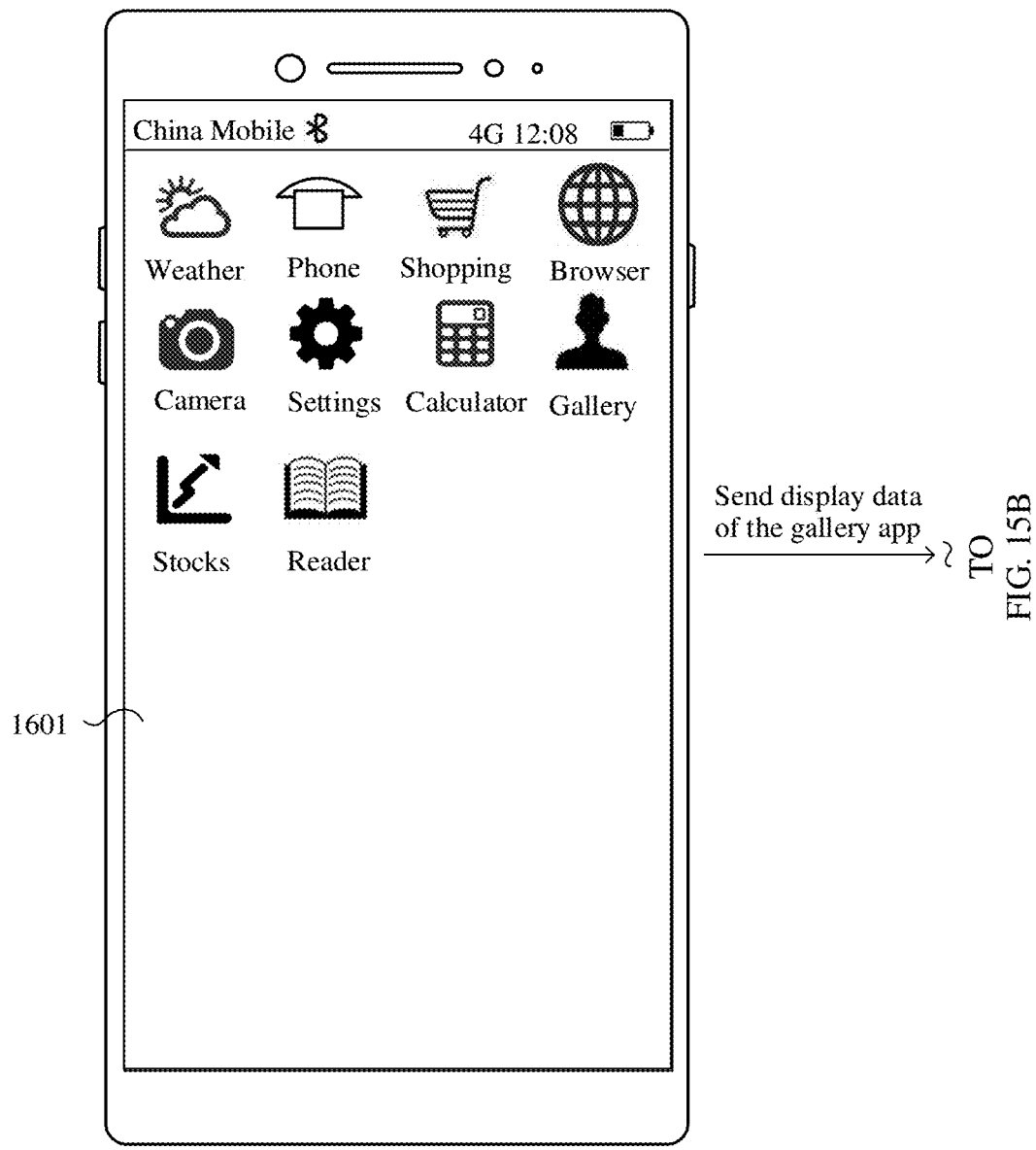
FIG. 15A and FIG. 15B are a schematic diagram 12 of an application scenario of a multi-screen collaboration method according to an embodiment of this application.
Figure 15B:
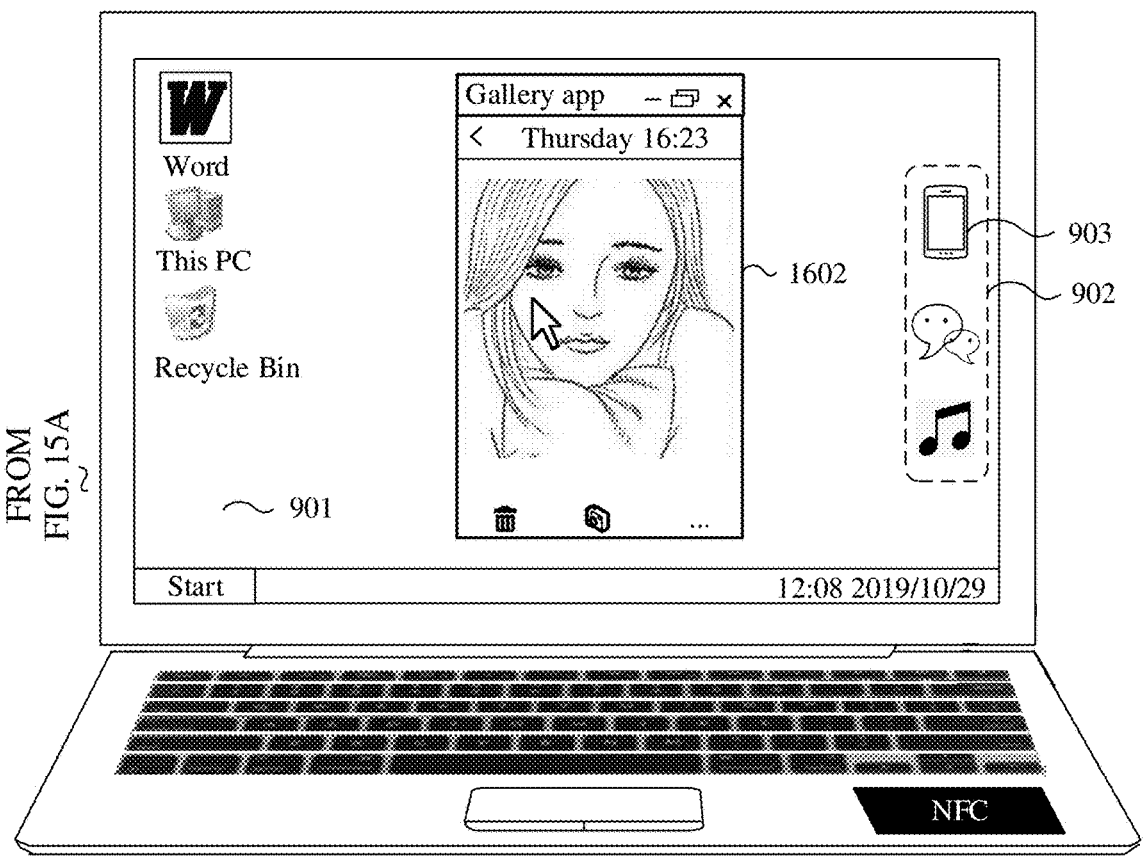

In some embodiments, after receiving the first control message sent by the notebook computer, the mobile phone may trigger execution of the corresponding operation instruction for the gallery app in the foreground, or may trigger execution of the corresponding operation instruction for the gallery app in the background. As shown in FIG. 15A and FIG. 15B, when the mobile phone is running a desktop 1601 and receives the first control message, the mobile phone is running the gallery app in the background and displaying the desktop 1601 in the foreground. In this case, after converting the first control message into the touch event of the user at the point A, the mobile phone may report the touch event to the gallery app that is being run in the background. Then, in response to the touch event in the background, the operation instruction for opening the photo 1501 may be executed for the gallery app. In this case, still as shown in FIG. 15A and FIG. 15B, while displaying the desktop 1601 in the foreground, the mobile phone may send the new display data generated for the gallery app in the background to the notebook computer, and trigger the notebook computer to display an application interface 1602 of the gallery app after the photo 1501 is opened. In a word, when the user operates an app of the mobile phone on the notebook computer to implement a related function, an original running status of the mobile phone is not affected, and the user can still normally operate various applications and functions of the mobile phone.

In some embodiments, after the mobile phone projects the application list of the mobile phone onto the notebook computer, the user may open a plurality of applications in the application list on the notebook computer. This implements display of the plurality of applications in cross-screen mode. For example, after the notebook computer displays the first application window of the first application (that is, step S806), the user may further continue to open a second application in the application list on the notebook computer. In this case, the mobile phone and the notebook computer may further continue to perform the following steps S809 to S813.

S809: In response to an operation of selecting the second application from the application list by the user, the notebook computer sends a second startup message to the mobile phone, where the second startup message includes an identifier of the second application.

Figure 16:
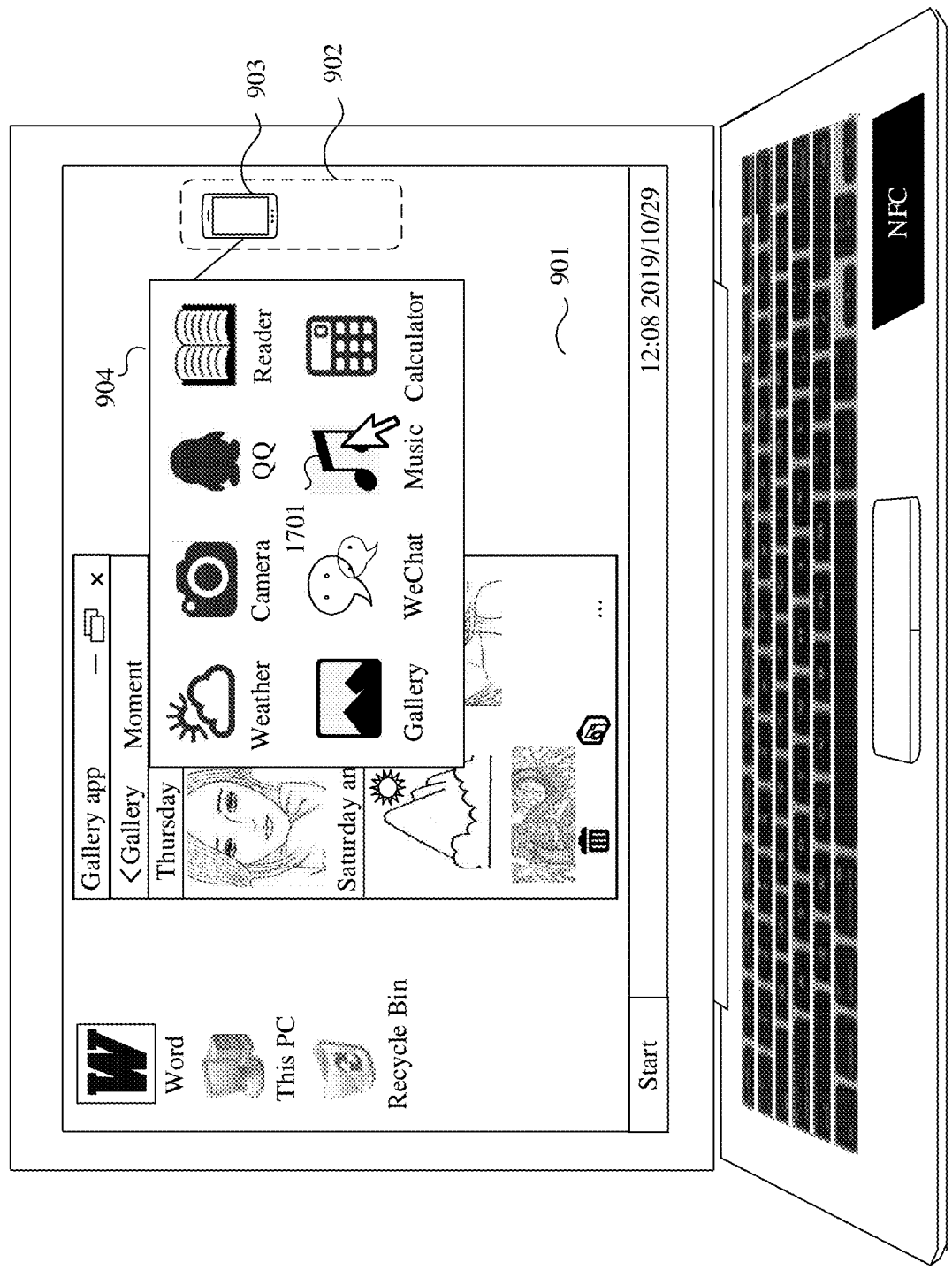
FIG. 16 is a schematic diagram 13 of an application scenario of a multi-screen collaboration method according to an embodiment of this application.

Similar to step S804, after the user opens the gallery app of the mobile phone from the application list 904 on the notebook computer, the user may further continue to open the application list 904, and select, from the application list 904, an application that needs to be opened. For example, as shown in FIG. 16, if the user further expects to project a music app of the mobile phone onto the notebook computer for display, the user may operate the cursor on the notebook computer to click an icon 1701 of the music app. After detecting that the user clicks the icon 1701 of the music app, the notebook computer may include an identifier of the music app in the second startup message and send the second startup message to the mobile phone, to indicate the mobile phone to project the music app onto the notebook computer for display.

S810: In response to the second startup message, the mobile phone sends display data that is of an application interface of the second application and that is generated during running of the second application to the notebook computer.

S811: The notebook computer displays a second application window of the second application based on the display data.

Similar to steps S805 and S806, in steps S810 and S811, after the mobile phone receives the second startup message for the music app sent by the notebook computer, if the mobile phone has not run the music app, the mobile phone may first start the music app.

Figure 17A:
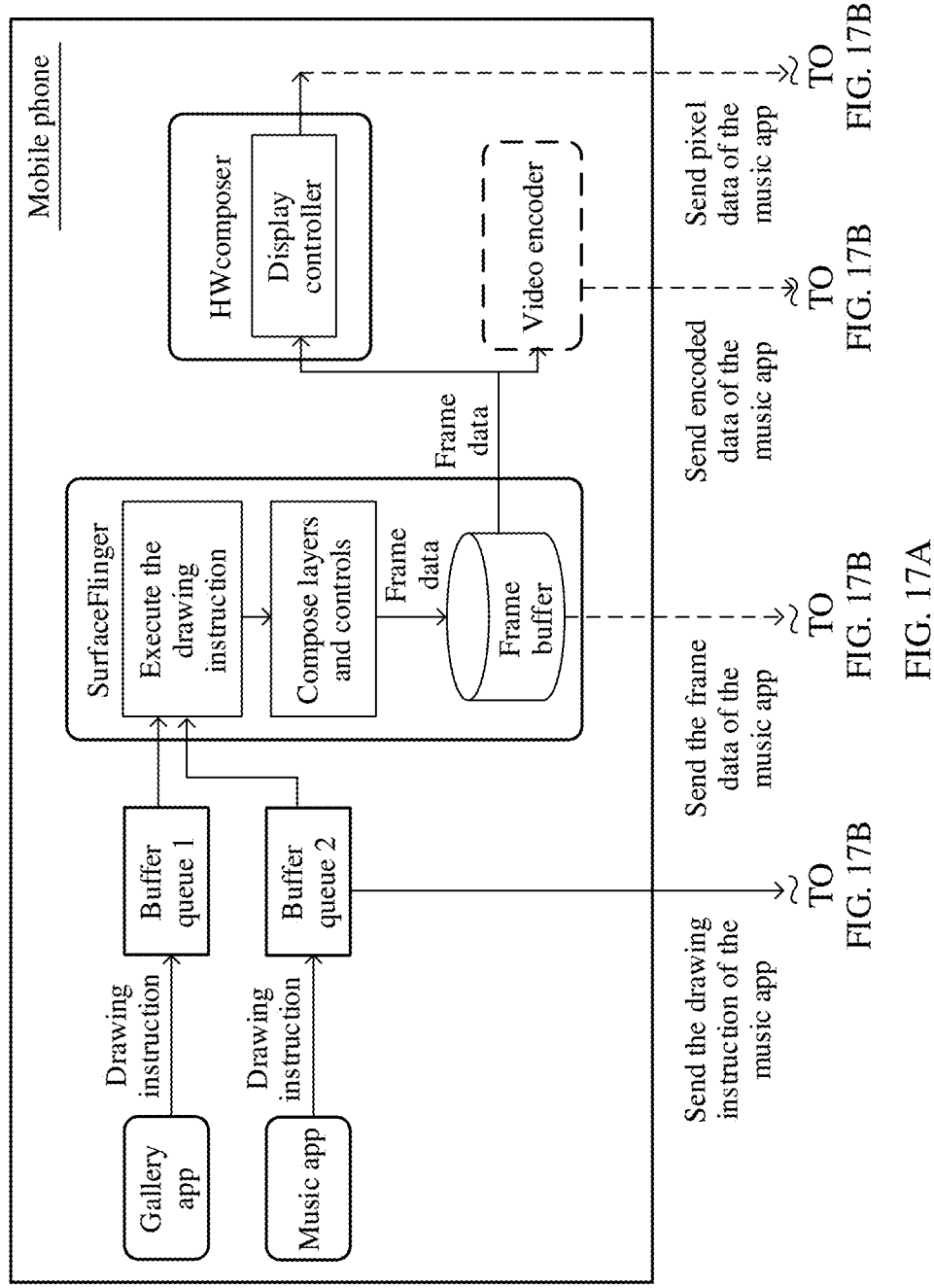
FIG. 17A and FIG. 17B are a schematic diagram 14 of an application scenario of a multi-screen collaboration method according to an embodiment of this application.

After the mobile phone starts the music app, in a process of running the music app (where the process is similar to the process of running the gallery app by the mobile phone shown in FIG. 12A), as shown in FIG. 17A, the mobile phone may send a drawing instruction in a corresponding buffer queue 2 to the notebook computer as display data of the music app, where the drawing instruction is generated during running of the music app. Alternatively, the mobile phone may send frame data of the music app in the frame buffer of the SurfaceFlinger to the notebook computer as display data of the music app, where the frame data is obtained during running of the music app. Alternatively, the mobile phone may send pixel data of the music app to the notebook computer as display data of the music app, where the pixel data is output by the HWcomposer in real time during running of the music app. Alternatively, the mobile phone may send encoded data of the music app to the notebook computer as display data of the music app, where the encoded data is output by the video encoder in real time during running of the music app.

Figure 17B:
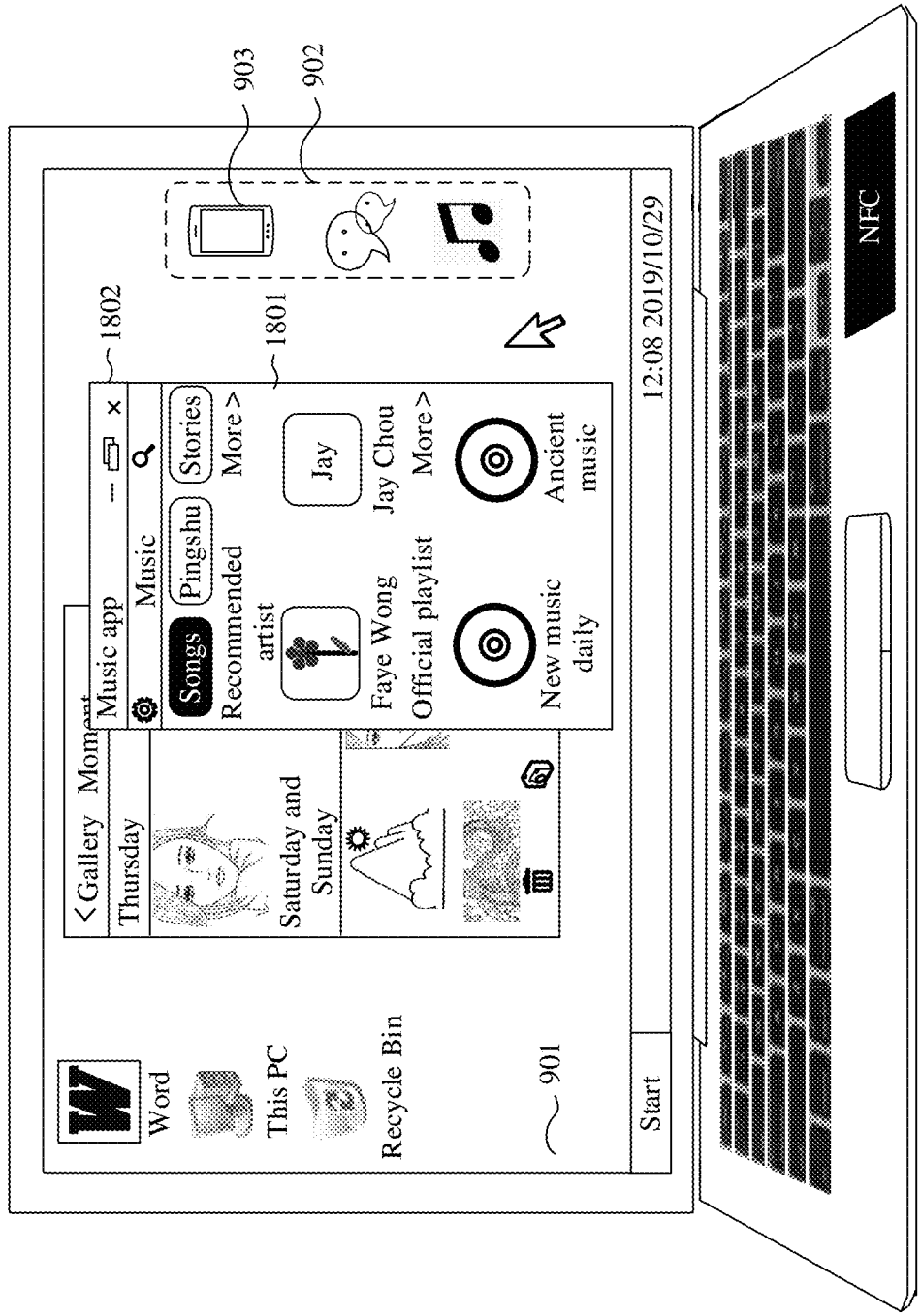

After the notebook computer receives the display data of the music app sent by the mobile phone, as shown in FIG. 17B, the notebook computer may draw an application interface 1801 of the music app based on the display data by using a display module of the notebook computer. Certainly, the notebook computer may further add a title bar 1802 to the application interface 1801, to display the application interface of the music app in a form of a window. In this case, the notebook computer may simultaneously display the application window of the music app and the application window of the gallery app on the desktop 901. This implements display of a plurality of applications in cross-screen mode.

S812: In response to a second operation input by the user in the second application window, the notebook computer sends a corresponding second control message to the mobile phone.

S813: In response to the second control message, the mobile phone executes, for the second application, an operation instruction corresponding to the second control message.

Similar to steps S807 and S808, in steps S812 and S813, after the notebook computer displays the application window of the music app on the desktop 901, the user may operate the application window of the music app on the notebook computer to control the music app run on the mobile phone. This implements various functions of a related application of the source device on the notebook computer (that is, the destination device).

For example, if detecting that the user inputs the second operation in the application window of the music app, the notebook computer may include, in the second control message, the identifier of the music app, an operation type of the second operation, and coordinates corresponding to the second operation in the application window, and send the second control message to the mobile phone. Then, the mobile phone may convert the second control message into a corresponding touch event, and report the touch event to the music app, so that a corresponding function may be invoked for the music app to execute the corresponding operation instruction. In this way, the user can operate content that is projected onto and displayed by the notebook computer (that is, the destination device). This implements various functions of a related application of the mobile phone (that is, the source device) on the destination device.

In some embodiments of this application, during running, the mobile phone may support a multi-display mode. In the multi-display mode, the mobile phone may output different display data to one or more external display devices for multi-screen display.

For example, after enabling the multi-display mode, the mobile phone may start to run DisplayManagerService (DisplayManagerService). The DisplayManagerService supports mirror displaying by a plurality of displays in a plurality of display types, including a local display type of the mobile phone, an HDMI display type, a display type that supports a Wi-Fi display protocol, and the like, to control logical display performed by a currently connected external display device. In other words, the DisplayManagerService may create and manage one or more logical displays (which may be referred to as a display module below). A display module may store display data on the mobile phone or an external display device.

For example, the DisplayManagerService may create a display module 1 with a size the same as a size of the display of the mobile phone, and send display data that needs to be displayed on the display of the mobile phone to the display module 1. Correspondingly, the display of the mobile phone may obtain corresponding display data from the display module 1, to display a corresponding interface.

For another example, in addition to the display module 1, the DisplayManagerService may further create a display module 2 with a specific size, and send display data of one or more applications that need to be displayed on an external display device 1 to the display module 2. Correspondingly, the external display device 1 may obtain corresponding display data from the display module 2, to display a corresponding interface.

For another example, in addition to the display module 1, the DisplayManagerService may further create a display module 2 and a display module 3. Both the display module 2 and the display module 3 correspond to an external display device 1. The display module 2 may be configured to store display data of an application 1, and the display module 3 may be configured to store display data of an application 2. Correspondingly, the external display device 1 may obtain the display data of the application 1 from the display module 2 for display, and the external display device 1 may obtain the display data of the application 2 from the display module 2 for display.

Figure 18:
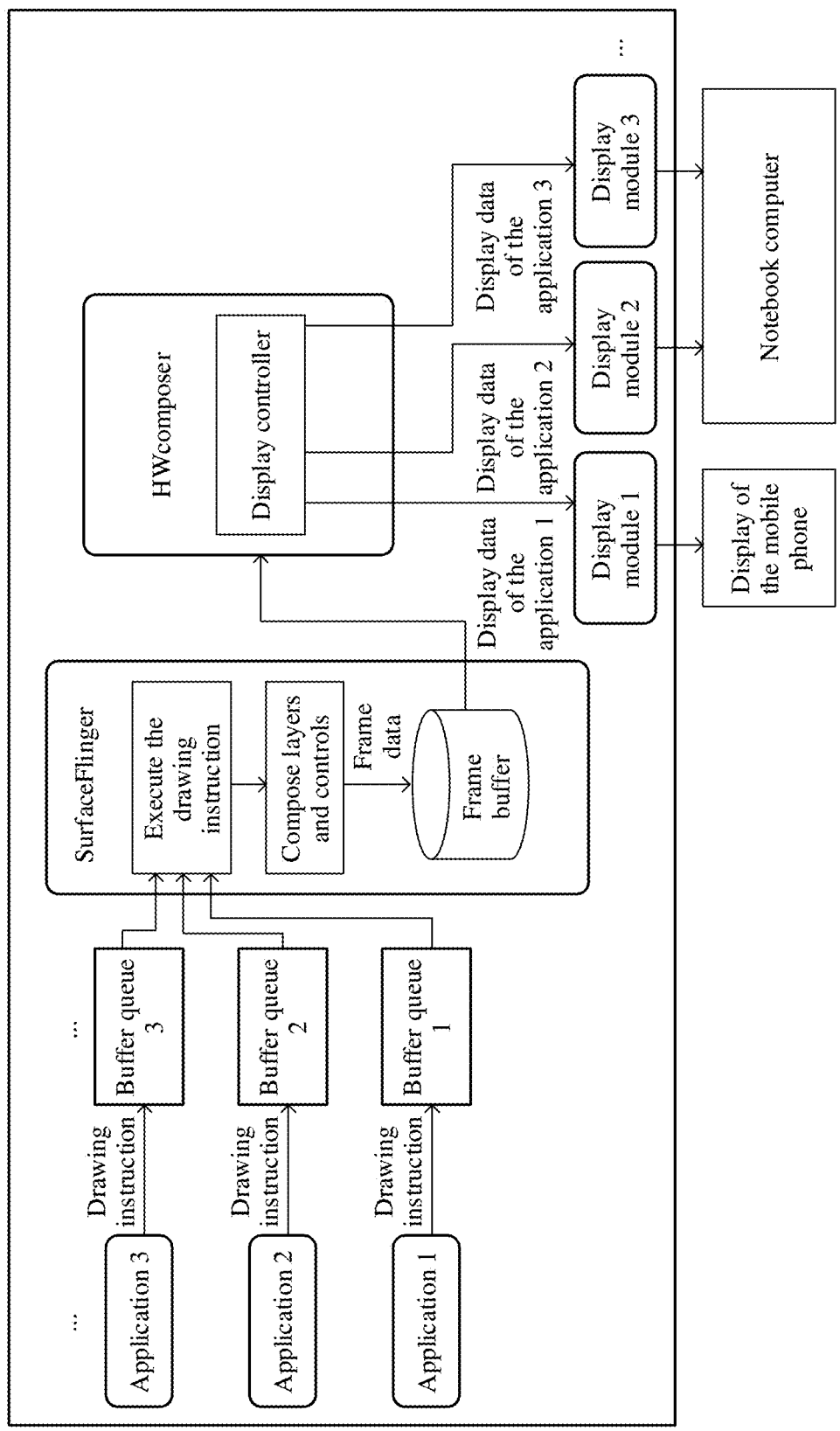
FIG. 18 is a schematic diagram 15 of an application scenario of a multi-screen collaboration method according to an embodiment of this application.

As shown in FIG. 18, when the mobile phone runs each application, the HWcomposer of the mobile phone may convert frame data output by the SurfaceFlinger into pixel data. Then, the HWcomposer may store the pixel data of each application in a corresponding display module as display data. In addition to the HWcomposer, other hardware (for example, a GPU) or software modules having a graphics processing capability in the mobile phone may also convert frame data output by the SurfaceFlinger into pixel data, and store the pixel data in a corresponding display module. In addition, display data stored in each display module may be encoded data obtained through encoding by the video encoder (not shown in the figure), or may be data that is not encoded by the video encoder. This is not limited in this embodiment of this application.

Still as shown in FIG. 18, the display module 1 of the mobile phone may be set to store display data of one or more applications that need to be displayed by the mobile phone. In other words, when the user opens one or more applications (for example, an application 1) on the mobile phone, the mobile phone may store display data (for example, pixel data) generated during running of the application 1 in the display module 1. Correspondingly, the display of the mobile phone may obtain the pixel data of the application 1 from the display module 1, to display a corresponding application interface.

In addition, each display module (for example, the display module 2 and the display module 3) of the mobile phone other than the display module 1 is set to store each application that needs to be displayed by the external display device 1. In other words, the mobile phone may separately store display data of one or more applications that need to be displayed by the external display device 1 in a corresponding display module. For example, when an application 2 needs to be displayed on the external display device 1, the mobile phone may store display data generated for the application 2 in the display module 2. If an application 3 also needs to be displayed on the external display device 1, the mobile phone may store display data generated for the application 3 in the display module 3. The external display device 1 may separately obtain the display data of the apps from the display module 2 and the display module 3, to display corresponding application interfaces on the external display device 1.

In some embodiments of this application, the notebook computer (namely, the destination device) may be used as an external display device (for example, the external display device 1) of the mobile phone. After the mobile phone receives a startup message for one or more applications that is sent by the notebook computer, the mobile phone may enter the multi-display mode and run the DisplayManagerService. In this case, still as shown in FIG. 18, the mobile phone may store, in the display module 1, the related display data of the application 1 that needs to be output to the display of the mobile phone. In addition, if the mobile phone receives a startup message for the application 2 sent by the notebook computer, the mobile phone may start to run the application 2, and store the display data generated during running of the application 2 in the display module 2.

Figure 21:
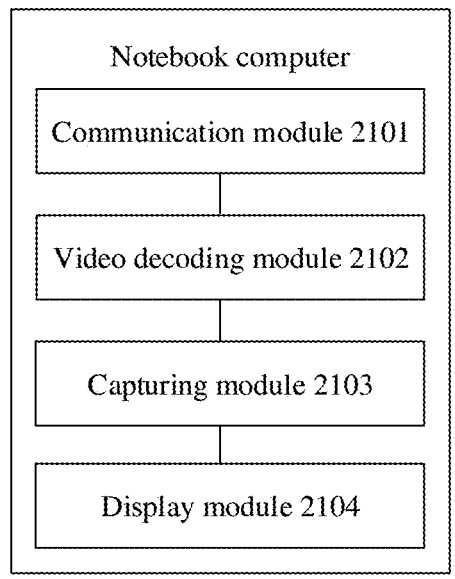
FIG. 21 is a schematic diagram of a structure of a notebook computer according to an embodiment of this application.

In the following, as shown in FIG. 21, the notebook computer may include a communication module 2101, a video decoding module 2102, a capturing module 2103, and a display module 2104. The communication module 2101 may obtain, from the display module 2 of the mobile phone, the display data generated for the application 2 in real time. If the display data is data encoded by the video encoder, the video decoding module 2102 may decode the display data. When storing the display data of the application 2 in the display module 2, the mobile phone may store the display data of the application 2 in the display module 2 in full-screen mode, or may store the display data of the application 2 at a specific location of the display module 2 based on a specific window size. The mobile phone may further send location information of the display data of the application 2 to the communication module 2101 of the notebook computer. For example, the display module 2 corresponds to a display with a size of 400*600, a size of an application window corresponding to the display data generated during running of the application 2 by the mobile phone is 100*200, and coordinates of an upper left vertex of the application window relative to the display with the size of 400*600 are (0, 0). In this case, when the mobile phone runs the application 2, the mobile phone may send the size (100*200) of the application window corresponding to the application 2 and the coordinates (0, 0) of the upper left vertex of the application window to the notebook computer as the location information of the display data.

In this case, the capturing module 2103 of the notebook computer may capture, from the display module 2 based on the location information, the display data corresponding to the application window of the application 2, and then the display module 2104 draws the application window of the application 2 on the notebook computer based on the display data. This implements display of the application on different devices in cross-screen mode.

In addition, when the notebook computer displays an application interface of the application 2, the user may further continue to open another application (for example, the application 3) of the mobile phone on the notebook computer. If the mobile phone receives a start message for the application 3 sent by the notebook computer, the mobile phone may start to run the application 3, and store the display data generated during running of the application 3 in the display module 3. Similarly, the communication module 2101 of the notebook computer may obtain, from the display module 3, the display data generated for the application 3 in real time, the video decoding module 2102 and the capturing module 2103 respectively decode and capture the display data in the display module 3, and finally the display module 2104 draws an application interface of the application 3 on the notebook computer based on the captured display data. In this case, the notebook computer may simultaneously display the application interface of the application 1 and the application interface of the application 2. This implements display of a plurality of applications in cross-screen mode.

Figure 19:
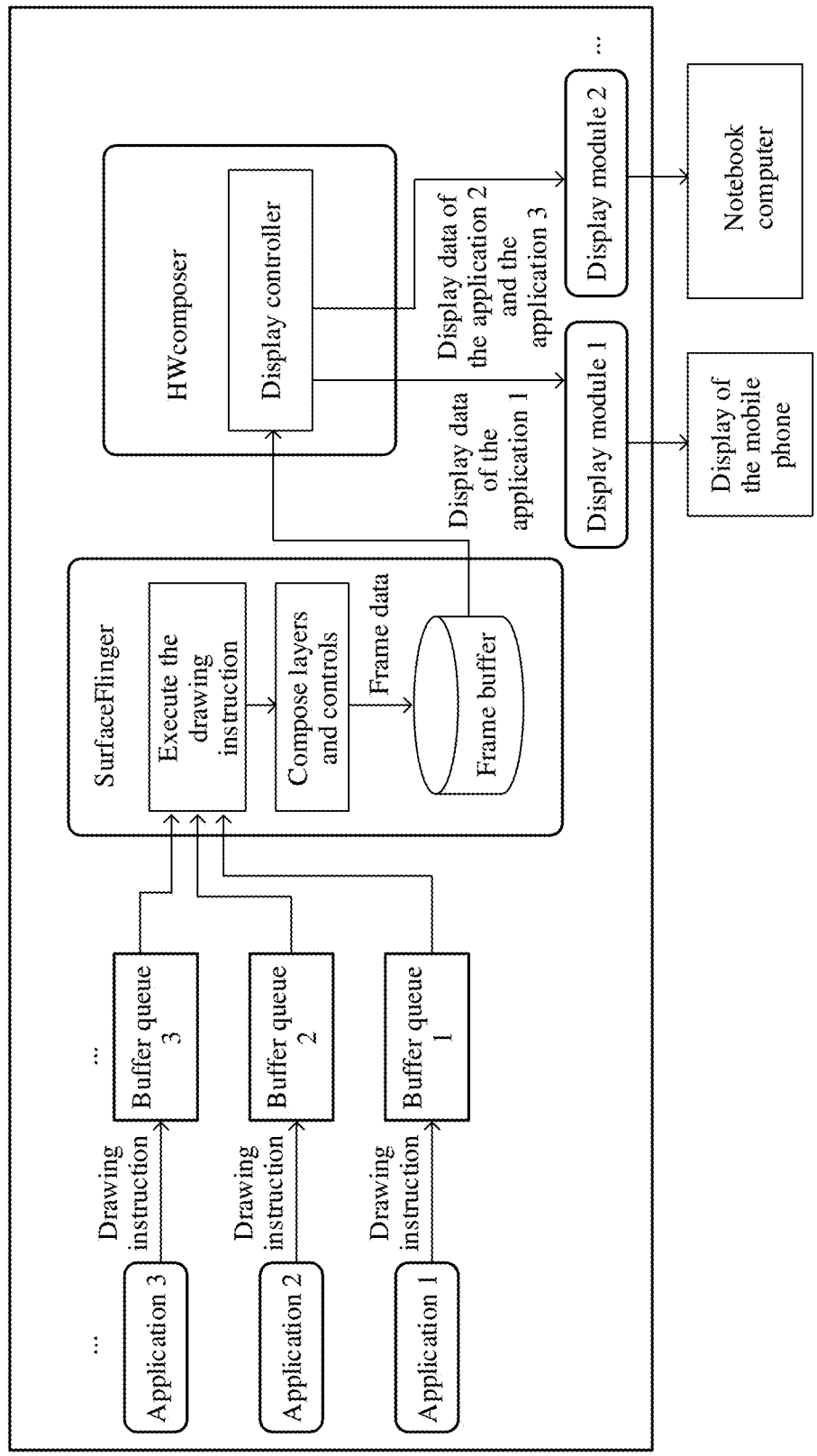
FIG. 19 is a schematic diagram 16 of an application scenario of a multi-screen collaboration method according to an embodiment of this application.

In some other embodiments, as shown in FIG. 19, each display module (for example, the display module 2 and the display module 3) of the mobile phone other than the display module 1 may be set to correspond to one external display device. In this case, the display module 2 is used as an example. The display module 2 may store display data of one or more applications that need to be displayed on an external display device (for example, the external display device 1).

Still as shown in FIG. 19, that the notebook computer (that is, the destination device) is used as the external display device 1 of the mobile phone is still used as an example. The mobile phone may store, in the display module 1, the related display data of the application 1 that needs to be output to the display of the mobile phone. In addition, if the mobile phone receives a startup message for the application 2 sent by the notebook computer, the mobile phone may start to run the application 2, and store the display data generated during running of the application 2 in the display module 2. Subsequently, the notebook computer may obtain, from the display module 2, the display data generated for the application 2 in real time, and draw the application interface of the application 2 on the notebook computer based on the display data. This implements display of the application on different devices in cross-screen mode.

A difference lies in the following: When the notebook computer displays the application interface of the application 2, if the mobile phone receives the startup message for the application 3 sent by the notebook computer, the mobile phone may start to run the application 3, and also store display the data generated during running of the application 3 in the display module 2. In other words, display data of all applications that need to be displayed on the notebook computer is stored in the corresponding display module 2.

When the display module 2 includes both the display data of the application interface of the application 2 and the display data of the application interface of the application 3, the application interface of the application 2 and the application interface of the application 3 may overlap in the display module 2. Therefore, the mobile phone may further send location information that is of the application interface of the application 3 currently operated by the user and that is relative to the display module 2 to the notebook computer. In this way, after the notebook computer obtains the display data in the display module 2, the capturing module 2103 of the notebook computer may capture, based on the location information, the display data corresponding to the application interface of the application 3. Then, the notebook computer may draw the application interface of the application 3 based on the captured display data. This implements display of a plurality of applications in cross-screen mode.

Alternatively, different display templates may be preset in the display module 2 for different applications that need to be displayed by the notebook computer. For example, when the notebook computer needs to display only one application of the mobile phone, all display space in the display module 2 may be set to store display data of the application. When the notebook computer needs to simultaneously display the application 1 and the application 2 of the mobile phone, display space of the display module 2 may be divided into space 1 and space 2 with equal sizes. The space 1 is used to store the display data of the application 1, and the space 2 is used to store the display data of the application 2.

Figure 20:
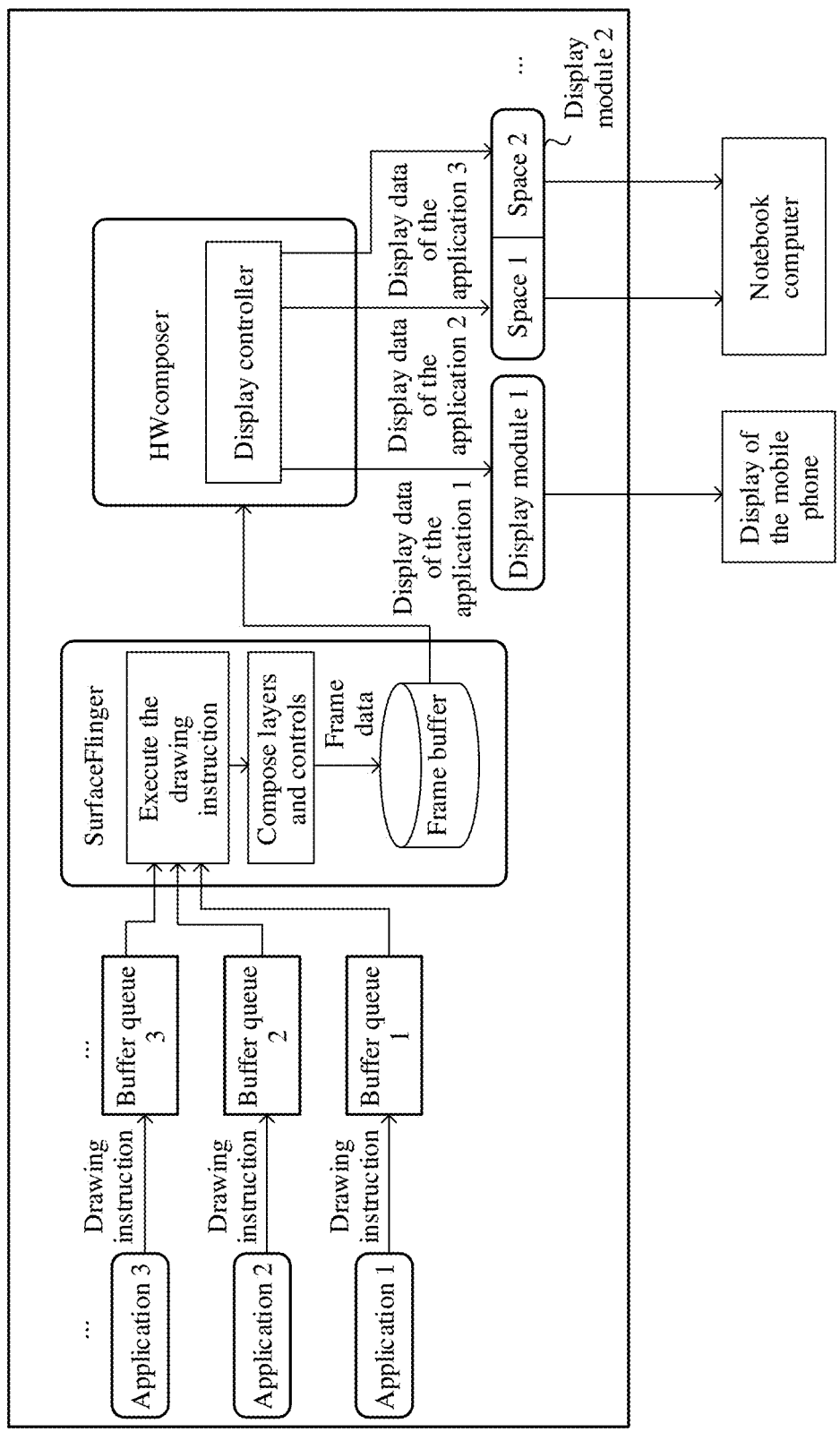
FIG. 20 is a schematic diagram 17 of an application scenario of a multi-screen collaboration method according to an embodiment of this application.

As shown in FIG. 20, when the notebook computer displays the application interface of the application 2, if the mobile phone receives the startup message for the application 3 sent by the notebook computer, the mobile phone may store the display data generated during running of the application 2 in the space 1 of the display module 2, and store the display data generated during running of the application 3 in the space 2 of the display module 2. In this way, block does not occur on display data of different applications in the display module 2. Subsequently, the notebook computer may obtain, from the space 1 of the display module 2, the display data generated for the application 2 in real time, and draw the application interface of the application 2 on the notebook computer based on the display data; and the notebook computer may obtain, from the space 2 of the display module 2, the display data generated for the application 3 in real time, and draw the application interface of the application 3 on the notebook computer based on the display data. This implements display of a plurality of applications in cross-screen mode.

Certainly, after the notebook computer displays the application interface of the application 1 or the application interface of the application 2, the user may further input a related operation such as an operation of dragging a window, a maximize operation, a minimize operation, or an operation of clicking a control in the application interface according to related descriptions in the foregoing embodiments, to implement a function of controlling a related application of the mobile phone on the notebook computer (that is, the destination device). This is not limited in this embodiment of this application.

Figure 22:
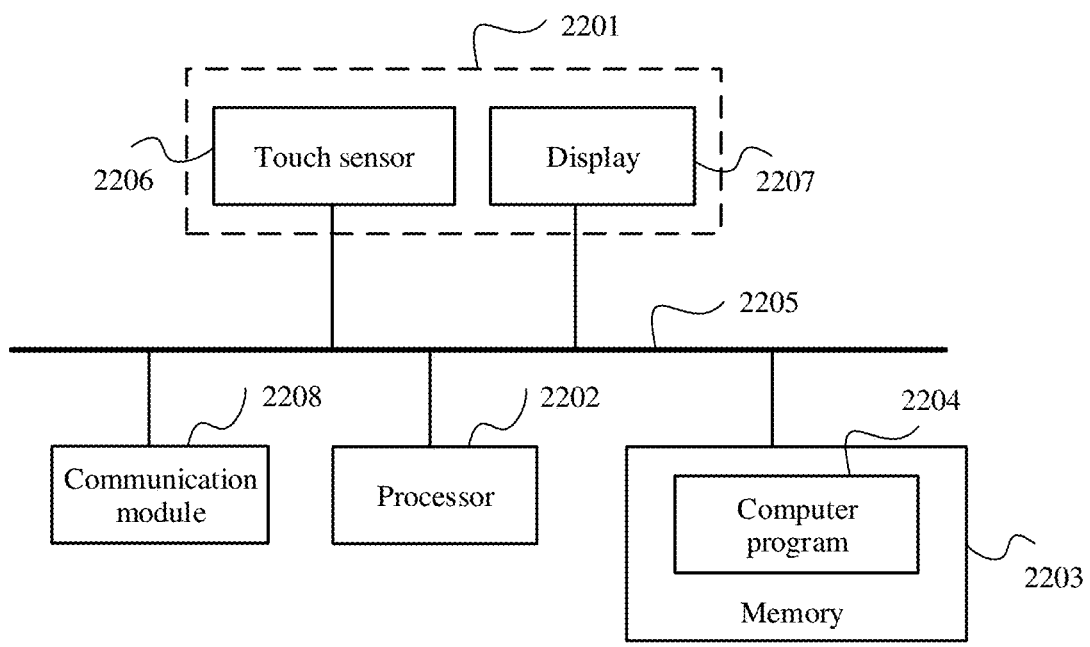
FIG. 22 is a schematic diagram 2 of a structure of an electronic device according to an embodiment of this application.

As shown in FIG. 22, an embodiment of this application discloses a source device, for example, the foregoing mobile phone. The source device may specifically include: a touchscreen 2201, where the touchscreen 2201 includes a touch sensor 2206 and a display 2207; one or more processors 2202; a memory 2203; a communication module 2208; one or more applications (not shown); and one or more computer programs 2204. These components may be connected by using one or more communications buses 2205. The one or more computer programs 2204 are stored in the memory 2203 and are configured to be executed by the one or more processors 2202. The one or more computer programs 2204 include instructions. The instructions may be used to perform the related steps performed by the source device in the foregoing embodiments.

Optionally, the source device may further include another component such as an NFC chip or an electronic label. This is not limited in this embodiment of this application.

Figure 23:
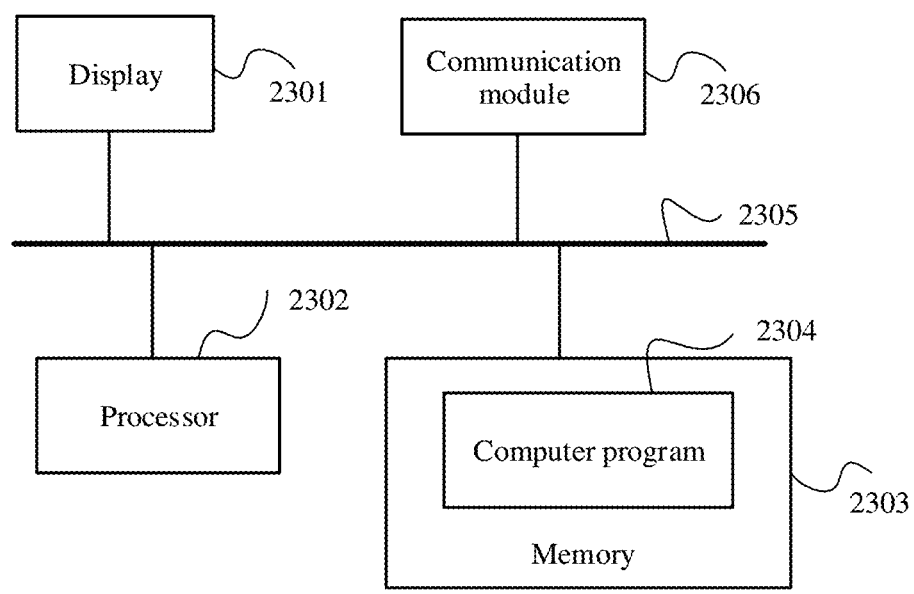
FIG. 23 is a schematic diagram 3 of a structure of an electronic device according to an embodiment of this application.

As shown in FIG. 23, an embodiment of this application discloses a destination device, for example, the foregoing notebook computer. The destination device may specifically include a display 2301, one or more processors 2302, a memory 2303, a communication module 2306, one or more applications (not shown), and one or more computer programs 2304. These components may be connected by using one or more communications buses 2305. The one or more computer programs 2304 are stored in the memory 2303 and are configured to be executed by the one or more processors 2302. The one or more computer programs 2304 include instructions. The instructions may be used to perform the related steps performed by the destination device in the foregoing embodiments.

Optionally, the destination device may further include another component such as a keyboard, a touch sensor, an NFC chip, or an electronic label. This is not limited in this embodiment of this application.

The foregoing descriptions about implementations allow a person skilled in the art to understand that, for the purpose of convenient and brief description, division into the foregoing functional modules is taken as an example for illustration. In actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

Functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes any medium that can store program code such as a flash memory, a removable hard disk, a read-only memory, a random access memory, a magnetic disk, or an optical disc.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

The invention claimed is:

1. A method, comprising:
sending, by a source device, application information of at least one source device application installed on the source device to a destination device, wherein the destination device displays an icon of the at least one source device application based on the application information, the source device runs a first operating system, and the destination device runs a second operating system;
receiving, by the source device, a first startup message sent by the destination device, wherein the first startup message comprises an identifier of a first application, and the at least one source device application comprises the first application;
starting, by the source device, the first application based on the identifier of the first application in response to the first startup message; and
sending first display data generated during running of the first application to the destination device.

2. The method according to claim 1, wherein:
the first display data is a drawing instruction that is generated for a first application interface during running of the first application;
the first display data is frame data that is generated by SurfaceFlinger (SurfaceFlinger) of the source device for the first application interface based on the drawing instruction during running of the first application; or
the first display data is pixel data that is generated by HWcomposer (HWcomposer) of the source device for the first application interface based on the frame data during running of the first application.

3. The method according to claim 1, wherein before sending, by the source device, the first display data generated during running of the first application to the destination device, the method further comprises:
encoding, by the source device, the first display data by using a video encoder.

4. The method according to claim 1, wherein starting, by the source device, the first application based on the identifier of the first application comprises:
starting, by the source device, the first application in a foreground or background based on the identifier of the first application.

5. The method according to claim 1, wherein the source device comprises a first display module and a second display module, the first display module is configured to provide display data for the source device, the second display module is configured to provide display data for the destination device, and the first display data is stored in the second display module; and
wherein each of the first display module and the second display module is a graphics processing unit (GPU) or a graphics card.

6. The method according to claim 5, wherein after sending, by the source device, the first display data generated during running of the first application to the destination device, the method further comprises:
receiving, by the source device, a second startup message sent by the destination device, wherein the second startup message comprises an identifier of a second application, and the at least one source device application comprises the second application;
starting, by the source device, the second application in response to the second startup message; and
sending second display data generated during running of the second application to the second display module.

7. The method according to claim 6, further comprising:
in response to the second startup message, sending, by the source device, location information of the second display data to the destination device.

8. The method according to claim 6, wherein the second display module comprises first display space and second display space, the first display space is used to store the first display data, and the second display space is used to store the second display data; and
wherein sending, by the source device, second display data generated during running of the second application to the second display module comprises:
sending, by the source device, the second display data generated during running of the second application to the second display space.

9. The method according to claim 5, wherein the source device further comprises a third display module, the third display module is also configured to provide display data for the destination device, and the third display module is a graphics processing unit (GPU) or a graphics card; and
wherein the method further comprises:
after sending, by the source device, the first display data generated during running of the first application to the destination device, receiving, by the source device, a second startup message sent by the destination device, wherein the second startup message comprises an identifier of a second application, and the at least one source device application comprises the second application; and
starting, by the source device, the second application in response to the second startup message, and sending second display data generated during running of the second application to the third display module.

10. A source device, wherein the source device comprises:
a display,
one or more processors,
a memory, and
a communication interface, wherein
the memory stores one or more computer programs, the one or more computer programs comprise instructions, and when the instructions are executed by the source device, the source device is enabled to perform:
sending application information of at least one source device application installed on the source device to a destination device, wherein the destination device displays an icon of the at least one source device application based on the application information, the source device runs a first operating system, and the destination device runs a second operating system;

receiving a first startup message sent by the destination device, wherein the first startup message comprises an identifier of a first application, and the at least one source device application comprises the first application;

starting the first application based on the identifier of the first application in response to the first startup message; and sending first display data generated during running of the first application to the destination device.

11. The source device according to claim 10, wherein:

the first display data is a drawing instruction that is generated for a first application interface during running of the first application;

the first display data is frame data that is generated by SurfaceFlinger (SurfaceFlinger) of the source device for the first application interface based on the drawing instruction during running of the first application; or the first display data is pixel data that is generated by HWcomposer (HWcomposer) of the source device for the first application interface based on the frame data during running of the first application.

12. The source device according to claim 10, wherein the source device is further enabled to perform:

encoding the first display data by using a video encoder.

13. The source device according to claim 10, wherein the source device is further enabled to perform:

starting the first application in a foreground or background based on the identifier of the first application.

14. The source device according to claim 10, wherein the source device comprises a first display module and a second display module, the first display module is configured to provide display data for the source device, the second display module is configured to provide display data for the destination device, and the first display data is stored in the second display module; and wherein each of the first display module and the second display module is a graphics processing unit (GPU) or a graphics card.

15. The source device according to claim 14, wherein the source device is further enabled to perform:

receiving a second startup message sent by the destination device, wherein the second startup message comprises an identifier of a second application, and the at least one source device application comprises the second application; and starting the second application in response to the second startup message, and sending second display data generated during running of the second application to the second display module.

16. The source device according to claim 15, wherein the source device is further enabled to perform:

sending location information of the second display data to the destination device.

17. The source device according to claim 15, wherein the second display module comprises first display space and second display space, the first display space is used to store the first display data, and the second display space is used to store the second display data; and wherein the source device is further enabled to perform:

sending the second display data generated during running of the second application to the second display space.

18. The source device according to claim 14, wherein the source device further comprises a third display module, the third display module is also configured to provide display data for the destination device, and the third display module is a graphics processing unit (GPU) or a graphics card; and wherein the source device is further enabled to perform:

receiving a second startup message sent by the destination device, wherein the second startup message comprises an identifier of a second application, and the at least one source device application comprises the second application;

starting the second application in response to the second startup message; and sending second display data generated during running of the second application to the third display module.

19. A method, comprising:

sending, by a source device to a destination device, application information of at least one source device application installed on the source device, wherein the source device runs a first operating system, and the destination device runs a second operating system;

displaying, by the destination device, an icon of the at least one source device application in a first interface based on the application information, and displaying, by the destination device in the first interface, an icon of at least one destination device application installed on the destination device;

obtaining, by the destination device in response to an operation performed by a user on an icon of a first application on the destination device, first display data generated during running of the first application on the source device, wherein the at least one source device application comprises the first application;

displaying, by the destination device, an application window of the first application in the first interface based on the first display data;

in response to an operation performed by the user on an icon of a second application on the destination device, starting, by the destination device, the second application; and displaying an application window of the second application in the first interface, wherein the at least one destination device application comprises the second application.

20. The method according to claim 19, wherein the application information comprises an identifier of the at least one source device application; and wherein obtaining, by the destination device in response to the operation performed by the user on the icon of the first application on the destination device, the first display data generated during running of the first application on the source device comprises:

sending, by the destination device, a first startup message to the source device in response to the operation performed by the user on the icon of the first application on the destination device, wherein the first startup message comprises an identifier of the first application; and starting, by the source device, the first application based on the identifier of the first application in response to the first startup message, and sending the first display data generated during running of the first application to the destination device.

* * * * *